United States Patent
Viswanathan et al.

(10) Patent No.: US 12,316,677 B2
(45) Date of Patent: May 27, 2025

(54) POLICY BASED ACCESS CONTROL SYSTEM WITH STANDARDIZED ENFORCEMENT LAYER

(71) Applicant: Accenture Global Solutions Limited, Dublin (IE)

(72) Inventors: Praveen Viswanathan, Jodhpur (IN); Bharath Kumar, Irvine, CA (US)

(73) Assignee: Accenture Global Solutions Limited, Dublin (IE)

( * ) Notice: Subject to any disclaimer, the term of this patent is extended or adjusted under 35 U.S.C. 154(b) by 255 days.

(21) Appl. No.: 17/877,273

(22) Filed: Jul. 29, 2022

(65) Prior Publication Data

US 2024/0048592 A1  Feb. 8, 2024

(51) Int. Cl.
*H04L 29/06* (2006.01)
*H04L 9/40* (2022.01)

(52) U.S. Cl.
CPC ............ *H04L 63/20* (2013.01); *H04L 63/101* (2013.01); *H04L 63/105* (2013.01)

(58) Field of Classification Search
CPC ..... H04L 63/20; H04L 63/101; H04L 63/105; H04L 63/10; G06F 21/6227; G06F 20/284; G06F 16/24522; G06F 16/2452
See application file for complete search history.

(56) References Cited

U.S. PATENT DOCUMENTS

| | | | |
|---|---|---|---|
| 2002/0157020 A1* | 10/2002 | Royer | H04L 63/1425 726/11 |
| 2004/0230795 A1* | 11/2004 | Armitano | H04L 63/10 713/165 |
| 2014/0201814 A1* | 7/2014 | Barkie | H04L 63/0892 726/4 |
| 2016/0205101 A1* | 7/2016 | Verma | G06F 40/284 726/1 |
| 2017/0257379 A1* | 9/2017 | Weintraub | H04L 63/107 |
| 2017/0318058 A1* | 11/2017 | Vahlis | H04L 63/0428 |
| 2023/0169074 A1* | 6/2023 | Kim | G06F 16/24522 704/9 |

* cited by examiner

*Primary Examiner* — Yogesh Paliwal

(57) ABSTRACT

Aspects of the present disclosure provide methods, devices, and computer-readable storage media that support dynamic enforcement of access control policies in a standardized manner. An administrator console enables access control policies to be defined as classes that may be combined and leveraged to rapidly define access control policies for enforcement in a standardized manner. An interceptor operates to detect access requests and perform policy administration (e.g., determining to grant/deny access) for the access requests and where access is granted, initiate policy resolution (e.g., determine any restrictions on the granted access request). An enforcer provides functionality for enforcing policy resolution outcomes, such as restricting access to information stored in a database or disabling interactive elements of a user interface. The enforcer may control enforcement of the policy resolution outcomes by modifying information in received access requests, such as to rewrite a query to incorporate restrictions on access to a data source.

17 Claims, 13 Drawing Sheets

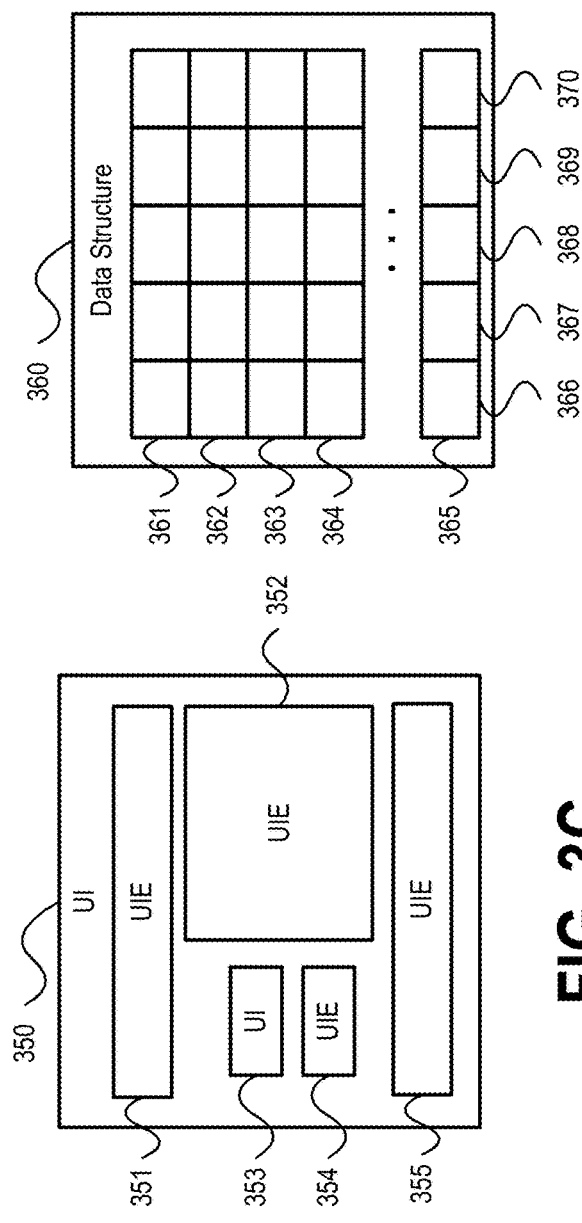
FIG. 3C
FIG. 3D
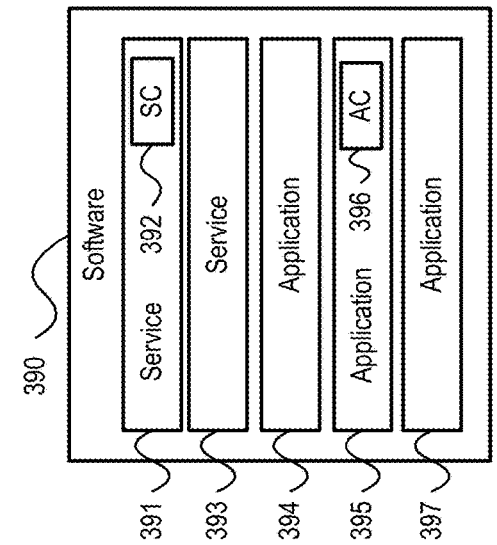
FIG. 3F
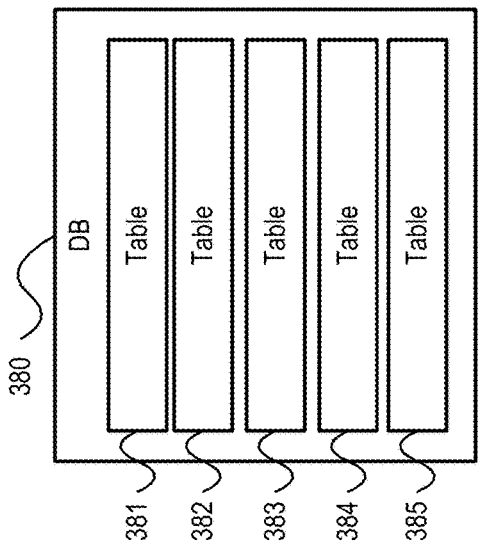
FIG. 3E

| Group | Research_Lab | Research_Lab | Research_Lab | Chemistry_Lab | Chemistry_Lab | Chemistry_Lab |
|---|---|---|---|---|---|---|
| Role | Research_Lab-director | Research_Lab-researchbiologist | Research_Lab-labtechnician | Chemistry_Lab-director | Chemistry_Lab-researchchemist | Chemistry_Lab-labtechnician |
| dm_assay | Y | Y | Y | Y | Y | Y |
| dm_compound | Y | N | N | Y | Y | Y |
| dm_compound_pubchem | Y | N | N | Y | Y | N |
| dm_compound_side_effect | Y | N | N | Y | Y | N |
| dm_hgnc_gene | Y | Y | Y | Y | N | N |
| dm_target | Y | Y | N | Y | N | N |
| dm_target_core | Y | Y | N | Y | N | N |
| dm_target_go | Y | Y | N | Y | N | N |

FIG. 4A

| Group | Role | Access |
|---|---|---|
| research_lab | research_lab-labtechnician | Restrict entire column 'target_pref_name' in table "dm_target_core" |
| chemistry_lab | chemistry_lab-researchchemist | Mask the cell where 'molecule_chembl_id' == 'CHEMBL1535', column name == 'canonical_smiles' with mask value "RESTRICTED" |
| chemistry_lab | chemistry_lab-labtechnician | Mask entire column 'canonical_smiles' in table "dm_compound" with mask value "RESTRICTED" |
| chemistry_lab | chemistry_lab-director | Mask entire row where 'target_chembl_id' == 'CHEMBL3736' in table "dm_compound" with mask value "RESTRICTED" |
| chemistry_lab | chemistry_lab-director | Full access |
| research_lab | research_lab-director | Full access |

FIG. 4B

| Group | Research_Lab | Research_Lab | Research_Lab | Chemistry_Lab | Chemistry_Lab | Chemistry_Lab |
|---|---|---|---|---|---|---|
| Role | Research_Lab-director | Research_Lab-researchbiologist | Research_Lab-labtechnician | Chemistry_Lab-director | Chemistry_Lab-researchchemist | Chemistry_Lab-labtechnician |
| gene_pathway_in volvement | Y | Y | Y | Y | N | N |
| gene_process_in volvement | Y | N | N | Y | Y | Y |
| gwas_signal | Y | N | Y | Y | Y | Y |
| gwas_signal_fine _mapping | Y | N | Y | Y | Y | Y |

FIG. 4C

| Group | Role | Access |
|---|---|---|
| Research_Lab | Research_Lab-labtechnician | Restrict entire column "neg_log_p_value" in table "gwas_signal" |
| Chemistry_Lab | Chemistry_Lab-researchchemist | Restrict entire column "effect_allele_freq" in table "gwas_signal_fine_mapping" |
| Chemistry_Lab | Chemistry_Lab-labtechnician | Mask entire column "neg_log_p_value" in table "gwas_signal" |
| Chemistry_Lab | Chemistry_Lab-labtechnician | Mask entire column "effect_allele_freq" in table "gwas_signal_fine_mapping" |
| | | Restrict entire row where variant ID == "rs676629" in table "gwas_signal" |
| | | Mask enire row where variant ID == "rs182997589" in table "gwas_signal_fine_mapping" |
| Chemistry_Lab | Chemistry_Lab-director | Full access |
| Research_Lab | Research_Lab-director | Full access |

FIG. 4D

| Group | Role | Dashboard | Created Days | UIEs |
|---|---|---|---|---|
| research_lab | research_lab-researchbiologist | Main Dashboard | 10 | Edit |
| | | | | Delete |
| | | Target Dashboard | 10 | Edit |
| | | | | Delete |
| | | | | Deletion of Entities |
| | | | | Add Entities |
| | | | | Adding an entity |
| | | Compound Dashboard | 10 | Edit |
| | | | | Delete |
| | | | | Find Similar – Add Set |
| | | | | Chemical Search |
| | | | | Add Entities |
| | | | | Deletion of Entities |
| | | | | Adding an entity |

FIG. 4E

POLICY BASED ACCESS CONTROL SYSTEM WITH STANDARDIZED ENFORCEMENT LAYER

TECHNICAL FIELD

The present disclosure relates generally to systems for controlling access to resources of a network or system and more specifically to systems and methods for improved enforcement of access control policies.

BACKGROUND

Policy-Based Access Control (PBAC) can be used to help enterprises implement concrete access controls based on abstract policy and governance requirements. However, current PBAC systems lack standardized enforcement mechanisms and instead rely on solo-type mechanisms, such as providing individual control and enforcement mechanisms per system (e.g., different access control mechanisms and systems for data sources, devices, applications, etc.) and/or region (e.g., separate access control mechanisms spread across different geographic locations). Such PBAC systems suffer from several drawbacks or challenges with respect to enforcement of access control policies, such as maintaining a uniform set of access control policies (e.g., it is difficult to propagate access control policy changes across these disparate systems and system components to ensure all systems are enforcing access control policies in the same way), as well as challenges with respect to creation and maintenance of policies. These challenges have resulted in systems that may experience degraded performance and non-uniform access control across enterprises, thereby presenting compliance and security risks.

SUMMARY

Aspects of the present disclosure provide methods, devices, and computer-readable storage media that support dynamic enforcement of access control policies in a standardized manner. The disclosed access control techniques provide a policy administrator console providing interactive functionality to enable access control policies to be defined in a standardized manner. In an aspect, a set of classes may be defined using functionality of the policy administrator, where the set of classes define standardized mechanisms for defining access control policies for a diverse set of digital resources (e.g., data sources, applications, user interfaces (UIs) and UI elements (UIEs), devices, services, and the like). The access control policy classes may be combined and customized by a user (e.g., a user responsible for defining and managing access control policies) to rapidly define access control policies for enforcement in a standardized manner. Furthermore, through use of class-type structures to define access control policies, changes made to the classes may be propagated quickly to the policies built based on those classes, thereby ensuring that changes are applied uniformly to all access control policies when changes are made.

In addition to improved techniques for defining access control policies, embodiments also provide uniform enforcement mechanisms for policy administration decisions (e.g., determining whether to grant/deny access) and policy resolution (e.g., applying or enforcing restrictions on granted access requests). To illustrate, an interceptor provides a centralized mechanism for detecting access requests. The interceptor analyzes the access request and coordinates identification of access control policies applicable to the request and policy administration decisions with respect to the access requests. Where access is granted, the interceptor may provide functionality supporting policy resolution decisions configured to determine restrictions, if any, that are to be imposed on the granted access requests. For example, when an access request associated with access of digital resources (e.g., data sources, applications or application elements, services or service elements, UIs or UIEs, devices, networks, entry control systems, and the like) is granted, the policy resolution decision may identify an access control policy or portion thereof (e.g., a policy resolution matrix) that specifies restrictions to be applied to the requested access.

An enforcer is provided by embodiments to enforce the restrictions determined during policy resolution. The enforcer provides a centralized mechanism for controlling enforcement of access control policies and any restrictions imposed by those access control policies. The enforcer may leverage a tokenizer, for example, to analyze queries in access requests to produce a set of tokens and a set of labels associated with the query. The enforcer may provide lexical analysis functionality for analyzing the set of labeled tokens to identify relationships between various components of the query and then use the relationships and information from policy resolution decisions (e.g., restrictions applicable to an access request) to rewrite the query in a form that complies with the restrictions designated in the policy resolution decision(s), thereby providing a standardized enforcement mechanism for controlling access to data sources. The rewritten query may then be validated using validation logic of the enforcer prior to being distributed for use in providing a user with access to the requested resource. Similar processes may be used by the enforcer to restrict access to UIs (e.g., by enabling or disabling UIEs within a UI or configuring a set of UIs that may be displayed (or not displayed) to the user in connection with an access request), devices, networks, entry systems, and other resources for which PBAC techniques may be used to control access.

The foregoing has outlined rather broadly the features and technical advantages of the present disclosure in order that the detailed description that follows may be better understood. Additional features and advantages will be described hereinafter which form the subject of the claims of the disclosure. It should be appreciated by those skilled in the art that the conception and specific aspects disclosed may be readily utilized as a basis for modifying or designing other structures for carrying out the same purposes of the present disclosure. It should also be realized by those skilled in the art that such equivalent constructions do not depart from the scope of the disclosure as set forth in the appended claims. The novel features which are disclosed herein, both as to organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

For a more complete understanding of the present disclosure, reference is now made to the following descriptions taken in conjunction with the accompanying drawings, in which:

FIG. 3C is a block diagram illustrating exemplary aspects of providing access to resources according to one or more aspects of the disclosure.

FIG. 3D is a block diagram illustrating exemplary aspects of providing access to resources according to one or more aspects of the disclosure.

FIG. 3E is a block diagram illustrating exemplary aspects of providing access to resources according to one or more aspects of the disclosure.

FIG. 3F is a block diagram illustrating exemplary aspects of providing access to resources according to one or more aspects of the disclosure.

FIG. 4A is a block diagram illustrating exemplary aspects of an access control policy according to one or more aspects of the disclosure.

FIG. 4B is a block diagram illustrating exemplary aspects of an access control policy according to one or more aspects of the disclosure.

FIG. 4C is a block diagram illustrating exemplary aspects of an access control policy according to one or more aspects of the disclosure.

FIG. 4D is a block diagram illustrating exemplary aspects of an access control policy according to one or more aspects of the disclosure.

FIG. 4E is a block diagram illustrating exemplary aspects of an access control policy according to one or more aspects of the disclosure.

It should be understood that the drawings are not necessarily to scale and that the disclosed aspects are sometimes illustrated diagrammatically and in partial views. In certain instances, details that are not necessary for an understanding of the disclosed methods and apparatuses, or which render other details difficult to perceive, may have been omitted. It should be understood, of course, that this disclosure is not limited to the particular aspects illustrated herein.

DETAILED DESCRIPTION

Some aspects of the present disclosure provide methods, devices, and computer-readable storage media that support dynamic enforcement of access control policies in a standardized manner. A policy administrator component provides functionality to support creation of access control policies in a standardized manner that enables rapid development and deployment of access control policies, as well as the ability to propagate changes to access control policies more easily as compared to existing systems. The disclosed policy enforcement systems and techniques also provide a centralized enforcement layer that leverages an interceptor to detect access requests, perform policy administration and resolution operations (e.g., to determine whether to grant/ deny access and identify restrictions on any granted access requests). The centralized enforcement layer also leverages an enforcer to provide a standardized mechanism for enforcing policy resolution outcomes, thereby ensuring that access to system resources is provided in a manner that complies with the restrictions identified in the policy resolution outcomes.

Figure 1:
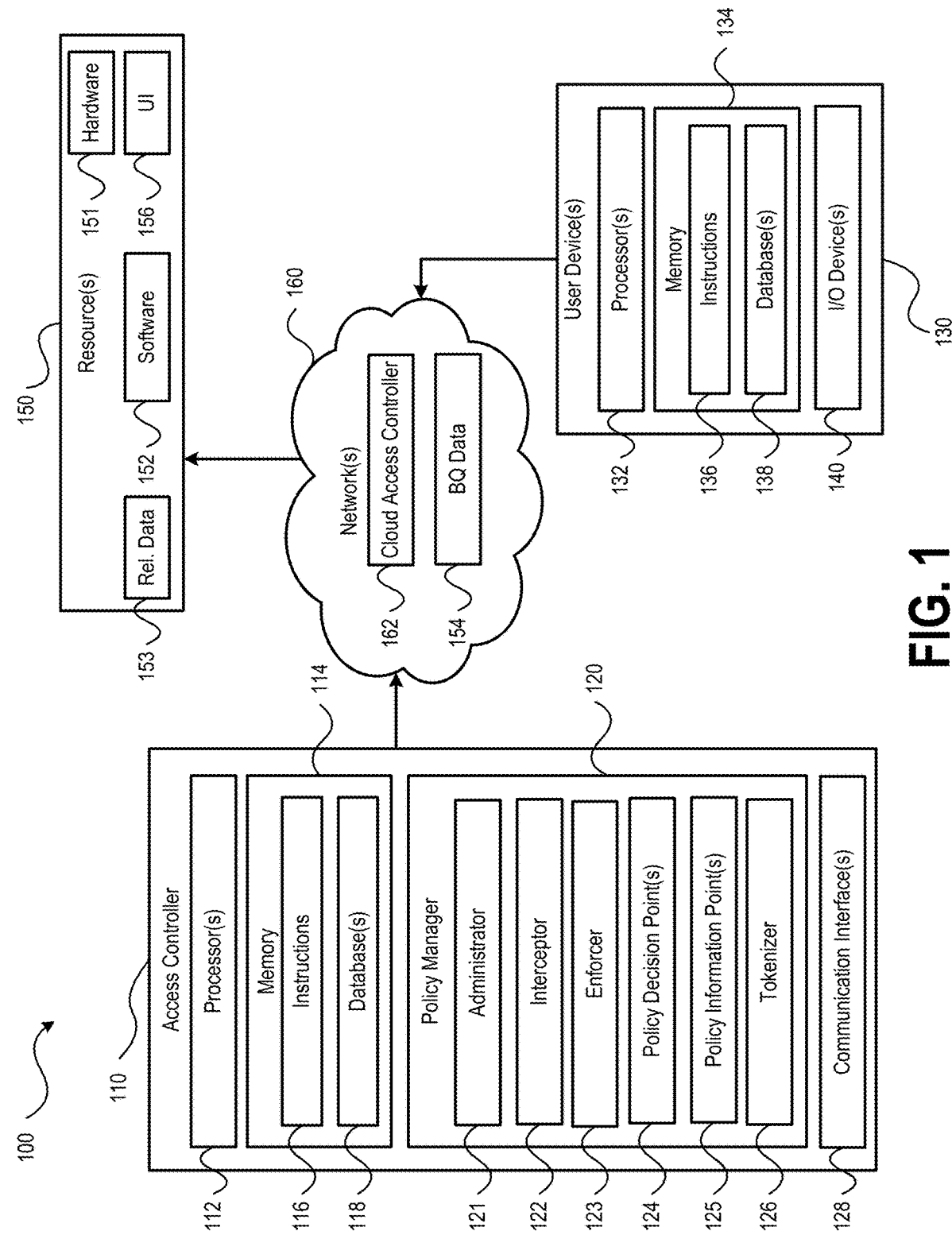
FIG. 1 is a block diagram illustrating an example of a system that supports policy based access control according to one or more aspects of the disclosure.

As shown in FIG. 1, the system 100 includes an access controller 110 communicatively coupled to resources 150 and to one or more user devices 130 via one or more networks 160. As will be described in more detail below, the access controller 110 provides functionality for generating policies that may be used to grant, deny, or restrict requests to access the resources 150 and for enforcing those policies in response to receiving requests to access the resources 150 from the one or more user devices 130. The functionality for generating and enforcing policies provided by the access controller 110 overcomes many of the disadvantages and bottlenecks present in current systems. For example, the access controller 110 provides a centralized platform for creation and enforcement of policies, thereby eliminating the need to deploy access controllers for specific resources Referring to FIG. 1, a block diagram illustrating an example of a system that supports policy based access control according to one or more aspects of the disclosure is shown as a system 100. As shown in FIG. 1, the system 100 includes an access controller 110 communicatively coupled to resources 150 and to one or more user devices 130 via one or more networks 160. The access controller 110 provides functionality for generating policies that may be used to control (e.g., grant, deny, or restrict) access to the resources 150 and for enforcing those policies in response to receiving requests to access the resources 150 from the one or more user devices 130. In the context of the present disclosure the resources 150 may include various types of physical and virtual assets for which access control is to be provided by the access controller 110, as described in more detail herein.

The access controller 110 is illustrated in FIG. 1 as including one or more processors 112, a memory 114, a policy manager 120, and one or more communication interfaces 128. Each of the one or more processors 112 may be a central processing unit (CPU) or other computing circuitry (e.g., a microcontroller, a graphics processing unit (GPU), one or more application specific integrated circuits (ASICs), and the like) and may have one or more processing cores. The memory 120 may include read only memory (ROM) devices, random access memory (RAM) devices, one or more hard disk drives (HDDs), flash memory devices, solid state drives (SSDs), other devices configured to store data in a persistent or non-persistent state, or a combination of different memory devices. The memory 120 may store instructions 116 that, when executed by the one or more processors 112, cause the one or more processors 112 to perform the operations described in connection with the access controller 110 with reference to FIGS. 1-7. Additionally, one or more databases 118 may be stored in the memory 114. As a non-limiting example, the one or more databases 118 include a policy database storing policies used to control access to the resources 150, a policy template database storing information utilized to create policies, an identity database storing identity for providing policy based access control (e.g., information associated with identities of users, identities of the resources 150, or other types of identity information that may be used to control access to the resources 150), and/or other types of databases supporting the access controller 110.

The one or more communication interfaces 128 may be configured to communicatively couple the access controller 110 to the one or more networks 160 via wired or wireless communication links according to one or more communication protocols or standards (e.g., an Ethernet protocol, a transmission control protocol/internet protocol (TCP/IP), an institute of electrical and electronics engineers (IEEE) 802.11 protocol, and an IEEE 802.16 protocol, a 3rd Generation (3G) communication standard, a 4th Generation (4G)/long term evolution (LTE) communication standard, a 5th Generation (5G) communication standard, and the like). Although not shown in FIG. 1, some implementations of the access controller 110 may include one or more input/output (I/O) devices to enable a user to receive information from or provide information to the access controller 110. For example, I/O devices may include one or more display devices, a keyboard, a stylus, one or more touchscreens, a mouse, a trackpad, a camera, one or more speakers, haptic feedback devices, or other types of devices that enable the user to leverage functionality of the access controller to create policies, modify policies, disable policies, or other types of operations consistent the present disclosure. In additional or alternative implementations, the user creates, modifies, and disables policies from a remote device, such as one of the user devices 150, communicatively coupled to the access controller 110 over the one or more networks 160.

The policy manager 120 provides functionality for managing various aspects of policy creation and enforcement. In an aspect, the policy manager 120 may be implemented in software and stored as instructions (e.g., the instructions 116) that, when executed by the one or more processors 112, cause the one or more processors to perform operations for creating, managing, and/or enforcing policies in accordance with the concepts described herein. In FIG. 1 the policy manager 120 is shown as including an administrator 121, an interceptor 122, an enforcer 123, a decision point 124, an information point 125, and a tokenizer 126, each of which is described in more detail below and represents different types of functionality that may be provided by the policy manager 120, as described in more detail below.

Figure 2:
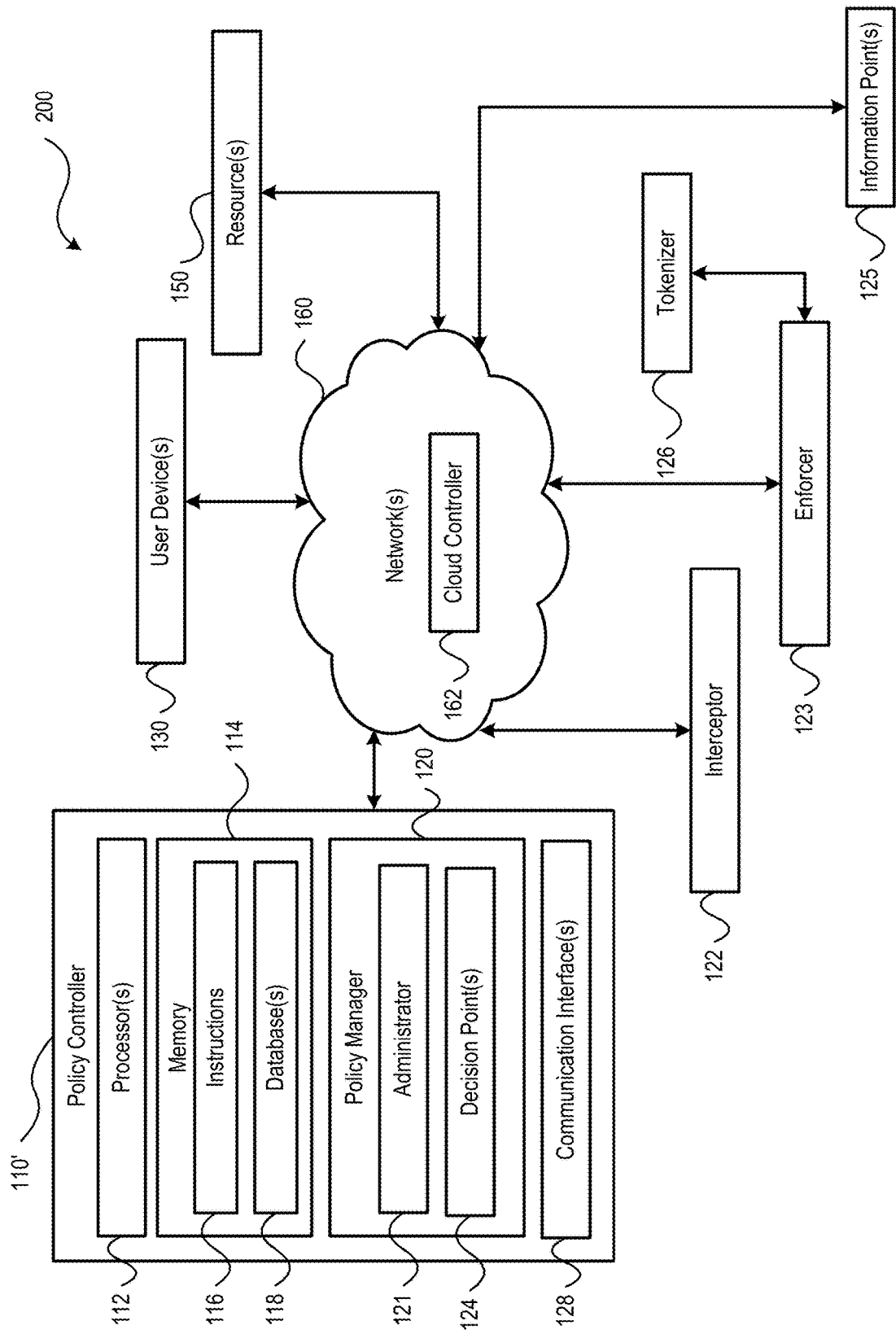
FIG. 2 is a block diagram illustrating another example of a system that supports policy based access control according to one or more aspects of the disclosure.

It is noted that FIG. 1 shows the access controller 110 being implemented or deployed as a single server or computing device for purposes of illustration, rather than by way of limitation and that functionality provided by the access controller 110 may be provided via other types of deployments, such as a cloud-based access controller 162 or a distributed deployment (e.g., multiple servers). Additionally, it is noted that while shown in FIG. 1 as a single logical block, the policy manager 120 and its various components (e.g., the administrator 121, the interceptor 122, the enforcer 123, the decision point 124, the information point 125, and the tokenizer 126) may be implemented in other configurations if desired, such as a distributed configuration in which one or more functions of the policy manager 120 are provided via separate devices (e.g., servers or other types of computing devices), virtual machines, cloud-based services, other implementations, or a combination thereof (e.g., a combination of devices and virtual machines, devices and cloud-based services, and so on). As a non-limiting example, a distributed implementation of the policy manager 120 is shown in FIG. 2 and described in more detail below.

The one or more networks 160 may include local area networks (LANs), wide area networks (WANs), wireless LANs (WLANs), wireless WANs, metropolitan area networks (MANs), cellular data networks, cellular voice networks, the Internet, and the like. The communication links provided via the one or more networks may include wired or wireless communication links established according to one or more communication protocols or standards (e.g., an Ethernet protocol, a transmission control protocol/internet protocol (TCP/IP), an institute of electrical and electronics engineers (IEEE) 802.11 protocol, and an IEEE 802.16 protocol, a 3rd Generation (3G) communication standard, a 4th Generation (4G)/long term evolution (LTE) communication standard, a 5th Generation (5G) communication standard, and the like).

As shown in FIG. 1, the user devices 130 include one or more processors 132, a memory 134, and one or more I/O devices 140. Each of the one or more processors 132 may be a CPU or other computing circuitry (e.g., a microcontroller, a GPU, one or more ASICs, and the like) and may have one or more processing cores. The memory 134 may include ROM devices, RAM devices, one or more HDDs, flash memory devices, SSDs, other devices configured to store data in a persistent or non-persistent state, or a combination of different memory devices. The memory 134 may store instructions 136 that, when executed by the one or more processors 132, cause the one or more processors 132 to perform the operations described in connection with the user device(s) 130 with reference to FIGS. 1-7. As a non-limiting example, the instructions 136 stored in the memory 134 of the user device 130 may correspond to software or applications providing functionality that enables a user to access various ones of the resources 150. Such applications may enable the user to define queries for retrieving data from databases of the resources 150, such as the relational database 153 or the BigQuery database 154. As described in more detail below, policies defined in accordance with the present disclosure may be utilized to control access to the databases, which may include enforcing restrictions on the access provided to users. In addition to controlling access to the databases, access control policies may also be used to control access to user interfaces (UIs) (e.g., user interfaces of the applications or software stored as the instructions 136 and/or browser-based applications and interfaces), UI elements (UIEs) (e.g., interactive elements and controls of UIs, such as buttons, forms, data fields, display areas, checkboxes, and the like) that may be used to interact with various ones of the resources 150 (e.g., to view, create, modify, and delete data from the databases 153, 154; launch applications or services included in the software 152; and access the hardware 151 (e.g., IoT devices, sensors, door locks and entry/exit systems, printers, phones, scanners, computing devices, and the like), or other types of physical resources), as described in more detail below.

Although not shown in FIG. 1, the user device 130 may include one or more communication interfaces may be configured to communicatively couple the user device 130 to the one or more networks 160 via wired or wireless communication links according to one or more communication protocols or standards (e.g., an Ethernet protocol, a TCP/IP, an IEEE 802.11 protocol, and an IEEE 802.16 protocol, a 3G communication standard, a 4G/LTE communication standard, a 5G communication standard, and the like). The one or more I/O devices 140 may include one or more display devices, a keyboard, a stylus, one or more touchscreens, a mouse, a trackpad, a camera, one or more speakers, haptic feedback devices, or other types of devices that enable the user to leverage functionality of the user device 130 and/or applications accessible to the user device 130 to access the resources 150 or other operations in accordance with the policies administered by the access controller 110.

As briefly described above, the resources 150 may include various types of physical and virtual assets. For example, the resources 150 may correspond to hardware 151 (e.g., computing devices, sensors, Internet of Things (IoT) devices, network infrastructure, databases or database servers, the one or more user devices 130, and other types of devices), software 152 (e.g., applications, web pages or websites, network or cloud services, etc.), data (e.g., data stored in relational databases 153, BigQuery data 154 stored in a cloud or other data warehouse, data stored in file systems, other types of data and data storage systems, or combinations thereof), or other physical or virtual assets of a system (e.g., user interface (UI) elements 156, consumable resources (e.g., laboratory materials, etc.), or other assets) for which policy based access control is to be provided via the access controller 110. It is noted that in some aspects, the access controller 110 may not be communicatively coupled to all of the resources 150 via the one or more networks 160 (e.g., UI elements of an interface, consumable resources, or other resources). It is noted that in the context of the present disclosure the resources 150 may also include various types of physical and virtual assets of an organization (e.g., a company, a government, etc.), a sub-component of an organization (e.g., a department of a company or government agency), multiple organizations (e.g., a consortium, etc.), or other types of entities and arrangements.

Figure 3A:
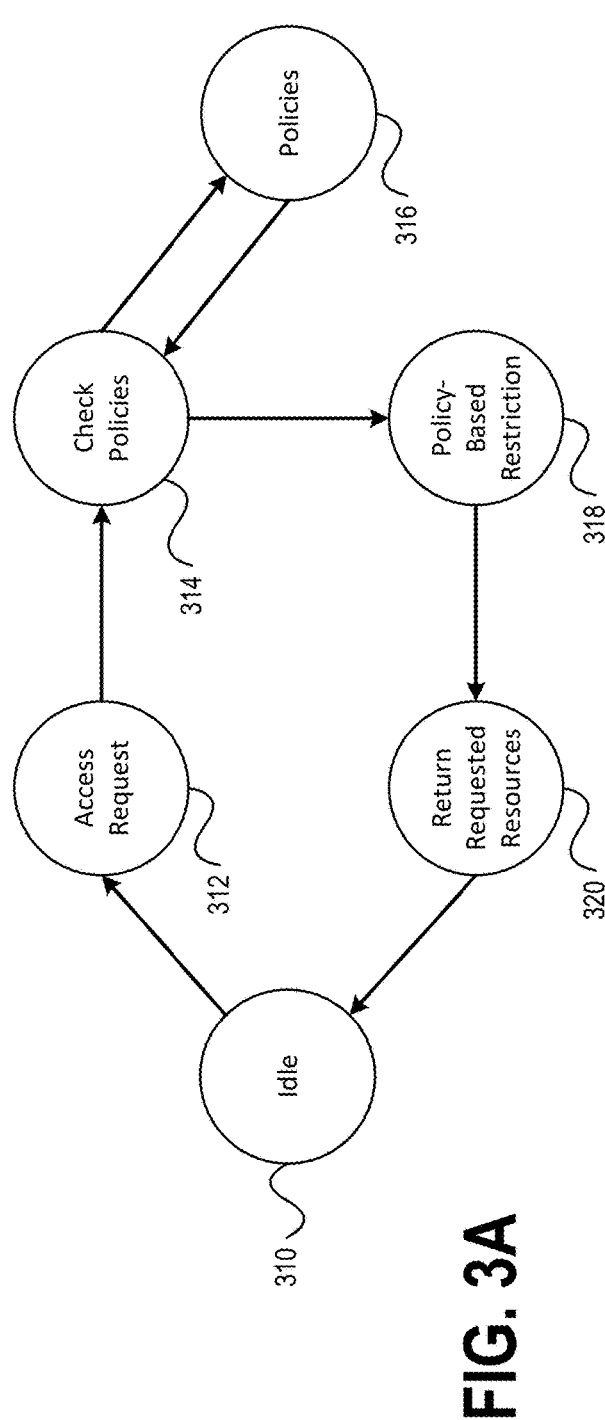
FIG. 3A is a block diagram illustrating a state transition diagram for providing policy based access control in accordance with the present disclosure.
Figure 3B:
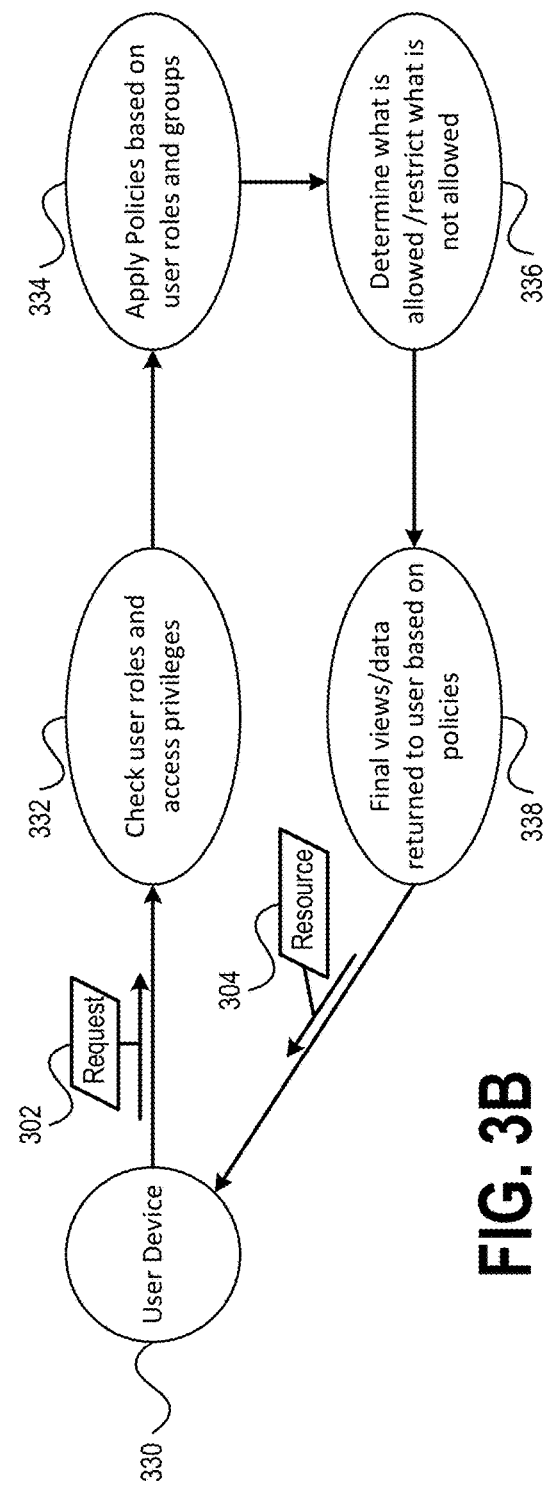
FIG. 3B is a block diagram illustrating a use case for providing policy based access control in accordance with the present disclosure.

Before going into detail regarding the functionality of the access controller 110 and more specifically, the policy manager 120, a brief overview of an exemplary and non-limiting use case for which policy based access control may be provided in accordance with the concepts described herein will be described. Referring to FIGS. 3A and 3B, block diagrams illustrating a state transition diagram and a use case for providing policy based access control in accordance with the present disclosure are shown. In FIG. 3A, the system, and more specifically, the access controller 110 of FIG. 1, may initially be in an idle state 310, which corresponds to a state in which the access controller is awaiting a request for access to resources. As shown in FIG. 3B, a user device 330 generates a request 302 to access a resource (e.g., one of the resources 150 of FIG. 1) that is detected by the access controller. Upon receiving the request 302, the access controller transitions to access request state 312 of FIG. 3A. In the access request state 312 the access controller may determine the type(s) of resource(s) for which access is requested by the request 302. After analyzing the request 304, the access controller may transition to the check policies state 314, during which the access controller checks the policies relevant to the request to determine user roles and access privileges for the requested resource(s), as shown at block 332 of FIG. 3B. From the check policies state 314, the access controller may transition to a policy retrieval state 316, during which the relevant portions of the policy or policies are obtained, and then transitions back to the check policies state 314 to verify the user roles and access privileges based on the retrieved policy information.

Once the user roles and access privileges are verified, the access controller may transition to the policy-based restriction state 318. In this state the access controller may apply the relevant provisions obtained from the policy information to the request 302 based on user roles, user groups, or other criteria in the policy information, as well as the requested resource(s), to determine whether to grant or deny access to the requested resource(s), as shown at block 334 of FIG. 3B. Upon determining to grant access to the resource, the access controller may determine whether access is granted or restricted, at block 336 of FIG. 3B. Upon determining the extent of the access to be granted, the access controller may transition to the return requested resources state 320, in which access to the requested resource(s) or if restricted access is granted, a portion of the requested resource(s), may be provided to the user device 300 as resource(s) 304, shown at block 338 of FIG. 3B. After providing the resource(s) 304 to the user device 300, the access controller may transition to the idle state 310 to await a next resource request.

It is noted that in some instances the access controller may not utilize the idle state 310. For example, the access controller may include a monitoring process that continually monitors for new resource requests and upon receiving a request, may spawn a request handling process or other routine, thread, etc. that processes the request (e.g., via the states 312-320 of FIG. 3A and the functionality of blocks 332-338 of FIG. 3B). Once the request is processed, the handling process may be terminated to free up computing resources (e.g., computational resources of the processor, memory, etc.) of the access controller.

Referring to FIGS. 3C-3F, which are block diagrams illustrating exemplary aspects of providing access to resources in accordance with the present disclosure, will now be described to further illustrate the concepts described with reference to FIGS. 3A-3B above. As described above, resources for which access control may be provided by an access controller in accordance with the present disclosure may include hardware (e.g., computing devices, IoT devices, etc.), software (e.g., applications, services, etc.), data (e.g., BigQuery data, SQL data, relational database data, etc.), of other types of resources. As a first non-limiting example and as shown in FIG. 3C, the resource may be a user interface 350 having various UI elements (UIEs) 351-355. The UIEs 351-355 may provide various types of functionality for the UI 350. For example, UIE 351 may be a dashboard comprising one or more selectable tabs, where each tab may display a set of UIEs; UIE 352 may be a viewing area, such as an area to view documents, data, or other information; UIEs 353, 354 may be controls (e.g., buttons, check boxes, dropdown menus, etc.) that a user may interact with to manipulate (e.g., view, create, modify, delete, save, export, copy, etc.) data, such as data displayed in the viewing area 352. The UIE 355 may provide other types of controls or functionality for the UI 350, such as a query builder that enables the user to construct queries that may be used to search one or more databases.

As described above with reference to FIGS. 3A and 3B, when the user requests access to the resource, which in this example is the UI 350, the access controller may determine the policies associated with the access request, which may be determined or identified based on the identity of the user, one or more roles or groups to which the user is assigned, or other factors. Once the policies are determined, the access controller may determine whether to grant or deny access. Where access to the UI 350 is authorized, the access controller may provide information to the user device or another device (e.g., a server hosting a web page or application providing the UI 350), thereby enabling the user to access the UI 350. In some instances however, access may be granted in a restricted manner. As an illustrative example, a user may be granted access to the UI 350, but one or more of the UIEs 351-355 may be hidden or disabled. For example, a user may be given access to sufficient UIEs to allow the user to query and view data, but the UI 350 may have UIEs associated with modifying/creating/deleting/exporting the data disabled. Furthermore, where the UIE 351 is a dashboard, one or more tabs or elements of the dashboard may be disabled or hidden. In this manner, the access controller can control access to user interface resources, but may also restrict the access provided to particular elements of those user interface resources.

In the example of FIG. 3D, a data structure 360 is shown as including data stored in a tabular format having a plurality of rows 361-365 and columns 366-370. As an example, the data structure 360 may represent a spreadsheet or simply a table in a database (e.g., the database(s) 138, the relational database(s) 153, or the BigQuery data 154 of FIG. 1). In controlling access to data stored in the data structure 360, the access controller may grant access to the entire data structure 360 (e.g., all rows and columns), deny access to the entire data structure 360, or restrict access to particular portions of the data structure 360 (e.g., particular rows, particular columns, particular cells (intersections of rows and columns), or combinations thereof). The ability to control access to stored data at the level granularity shown in FIG. 3D provides for robust control of access to the data, which may be particularly useful for many types of data. For example, customer data may include personally identifiable information (PII data), which may be subject to various government regulations and restrictions, as well as transaction data. By providing granular access to such data via the exemplary techniques shown in FIG. 3D, users can be provided access to the data in a manner that restricts viewing the rows, columns, or cells that contain PII data while being permitted to view other types of information present within the data.

In the example of FIG. 3E, a database 380 is shown including a plurality of tables 381, 382, 383, 384, 385. Utilizing the above-described techniques for providing access control in accordance with the concepts described herein, an access controller may grant a user access to the entire database 380, deny access to the entire database 380, or restrict access to the database 380 to certain ones of the tables 381-385. Moreover, providing restricted access to the database 380 may leverage the concepts described above with reference to FIG. 3E. For example, the tables 381-385 may include data organized into rows and columns. In such instances, an access controller may restrict access to tables of the database 380 on a row, column, or cell level, and even restrict different tables differently (e.g., full access to one table, access to specific rows/columns of another table, cells in a further table, and so on), thereby providing a robust set of features for controlling access to data stored in databases.

As explained above, software resources for which access controllers of the present disclosure may provide access control may include applications, services, websites, or other types of software or digital resources providing functionality, information, tools, or other capabilities to users. In FIG. 3F, a set of software resources 390 is shown and includes services 391, 393 and applications 394, 395, 397. Similar to the example of FIGS. 3C-3E, an access controller may grant a user access to all of the software resources 390, deny the user access to the software resources 390, or restrict access to particular services and/or software. As an example, the user may be granted access to the service 391 but not the service 393. As another example, the user may be granted access to the services 391, 393 and the application 395, but not the other applications 394, 397. Furthermore, the access controller may be enabled to restrict access to particular components of the services and/or applications. For example, service 391 is shown as including service component 392 and application 395 is shown as including application component 396. The service component 392 and the application component 396 may be associated with specific parts of the corresponding service or application. A user may be granted access to the service 391 and/or the application 395, but such access may be restricted to only the service component 392 (i.e., the user can access the service 391 but only use the functionality of the service component 392) or the application component 396 (i.e., the user can access the application 395 but only use the functionality of the application component 396). Alternatively or additionally, the access controller may only restrict the user from accessing the service component 392 (i.e., the user can access the service 391 but only use the functionality of with the exception of the functionality of the service component 392), or the application component 396 (i.e., the user can use the functionality of the application 395 with the exception of the functionality of the application component 396). As with the other example described above, it can be appreciated an access controller in accordance with the present disclosure provides robust capabilities for providing access to software resources. It is to be appreciated that the specific examples of controlling access to resources described and illustrated with reference to FIGS. 3A-3F have been provided for purposes of illustration, rather than by way of limitation. Accordingly, it should be understood that access controllers operating in accordance with embodiments of the present disclosure can be utilized to provide access control with respect to other types of resources and to provide other types of access controls with respect to the above-described resources depending on the particular system for which access control is provided.

Referring back to FIG. 1, the policy manager 120 provides various functionalities supporting the access controller 110, such as functionalities for enabling the access controller 110 to provide the access control techniques described above with reference to FIGS. 3A-3F. As briefly described above, the functionality of the policy manager 120 may be provided by various ones of the administrator 121, the interceptor 122, the enforcer 123, the decision point 124, the information point 125, and the tokenizer 126, each of which will now be described in more detail.

The administrator 121 provides functionality for designing or building policies used to provide access control in accordance with the present disclosure. For example, the administrator 121 may be an application (e.g., a policy administration application) providing a user interface that enables a user (e.g., a policy administrator) to create policies, test and troubleshoot policies, review audit logs, view system analytics, or other administrative-type functionality for configuring the access controller 110. The application may be provided as a standalone application, a browser-based application (e.g., an application accessible via a web page), or other implementations.

To create policies, the user interface of the application includes interactive elements and associated functionality providing policy authoring tools. As briefly described above, the access controller 110 is configured to provide a centralized platform for controlling access to the resources 150. In many use cases to which such access control may be provided, the resources 150 span across geographically disparate areas (e.g., multiple buildings, cities, counties, states, countries, continents, etc.). The policy creation functionality provided by the administrator 121 may utilize a set of policy objects to facilitate rapid creation of the policies, as well as association of policy provisions to various ones of the resources 150.

During policy creation a set of policy objects may be chosen, such as by selecting the policy objects using interactive elements of policy administration application. The policy objects selected for a given policy may depend on the policy being created, such as the types of access control to be provided (e.g., grant/deny or grant/deny/restrict), the types of resources for which access control is to be provided using the policy, or other factors. Below, exemplary policy objects that may be used to create policies using the policy administration application of the administrator 121 are described. However, it should be understood that the exemplary policy objects described below have been provided for purposes of illustration, rather than by way of limitation and other policy objects may be utilized by access controllers operating in accordance with the concepts described herein.

Namespace policy objects may represent administrative units within the organization. For example, a namespace policy object may be configured to specify an entity (e.g., a department, office, region, company, etc.) for which policy based access control is to be provided. The namespace policy objects may also be used to organize policies into a collection of policies for the entity and to managed access control for resources with respect to the entity based on the collection of policies.

Another type of policy object is an identity policy object. Identity policy objects may be used to represent individuals (e.g., users) or groups of individuals, such as users or groups of users that may request access to the resources 150. In some aspects, identity policy objects may be built dynamically based on attributes, which may be defined using the policy administration application. In an aspect, identify policy objects may also be utilized to associate individuals with one or more geographic regions, thereby enabling access policies to be applied based on geographic regions. Such capabilities may be particularly useful for controlling access to data subject to general data protection regulation (GDPR) requirements, which may limit transmission of certain types of data (e.g., personally identifiable information (PII) data) between different geographic locations or sharing such data with third parties.

The resources 150 may be associated with policies through asset policy objects. To illustrate, asset policy objects can be defined for data objects (e.g., tables, databases, etc.), data fields (e.g., particular rows, columns, or fields of a database or table, etc.), applications or services, devices (e.g., servers, IoT devices, printers, instruments, etc.), UI elements, or other types of resources. For example, asset policy objects for a database may be defined to specify different aspects of the database in a manner that may be used to control access in the manner described above with reference to FIGS. 3D and 3E. In such an example the asset policy objects may define the various elements of the database, such as tables, the types of data stored in each column or row of a table, or other types of information. For applications or services, asset policy objects can be used to define a set of applications and services for which policy based access control may be provided, as well as to identify any sub-units thereof (e.g., if an application/service provides different types of functionality each function may be associated with an asset policy object to enable access control on a per-functionality basis). Similarly, various devices for which policy based asset control may be provided according to the concepts disclosed herein may also be associated with asset policy objects to enable association of those devices with policies. It is noted that the exemplary types of resources or assets described above have been provided for purposes of illustration, rather than by way of limitation and that asset policy objects may be defined for other types of assets, whether physical assets (e.g., hardware, devices, etc.) or virtual (e.g., software-based applications or services, data, virtual machines, etc.), in accordance with the concepts described herein.

As described above, controlling access to the resources 150 may include granting access, denying access, or restricting access. The different types of access provided by a particular policy may be configured using policy-type policy objects. In an aspect, there may be two different kinds of policy-type policy objects, a grant policy object and a restrict policy object. The grant policy object may be used to define criteria for determining if, when, and how access is to be granted and the restrict policy object may be used to define criteria for determining if, when, and how access is to be denied or restricted. In an aspect, the grant-type policy objects and restriction-type policy objects may be used to define separate policies for controlling access to the resources 150. For example, a first access policy based on a grant-type policy object may be created to control granting access and a second access policy based on a restrict-type policy object may be created to control when access is to be denied or restricted. In additional or alternative aspects a policy may be defined using both grant-type policy objects and restriction-type policy objects, where each of these different policy objects specifies the criteria used to determine whether access is to be granted, denied, or restricted. In some aspects, access may be granted by default where resources are not covered by applicable policies. In additional or alternative aspects, access may be denied by default where resources are not covered by applicable policies. Furthermore, it should be understood that additional policy-type policy objects may be used in some implementations, such as using separate policy-type policy objects to deny and restrict access (e.g., a deny-type policy object and a restrict-type policy object), as a non-limiting example.

Processes to create policies may also utilize action policy objects, which may specify different types of actions upon which access may be controlled. The action policy objects may enable different policy outcomes to be determined based on an action associated with a request to access the resources 150. To illustrate, a policy granting a user access to a resource may include an action policy object value of "view", indicating the policy may be used to enable the user to view the associated resource. If the user is requesting access consistent with the "view" action policy object value (e.g., reading data from the resource) then access may be granted and the resource may be displayed to the user, but the request for access may be denied if the user is requesting another type of access (e.g., a write action for recording data to the resource).

Conditions policy objects can also be defined (e.g., as environmental attributes) that affect access decision for a defined policy. For example, conditions policy objects may enable policies to be built that grant, deny, or restrict access to the resources 150 based on days of the week (e.g., access granted Monday, Tuesday, and Thursday but denied the remaining days of the week), times of the day (e.g., access granted between 9:00 AM and 5:00 PM but denied the rest of the day), locations (e.g., access granted for requests received from one or more first locations but denied for requests received from one or more second locations), or combinations thereof. Conditions policy objects may also define access controls based on a number of accesses within period of time. To illustrate, a condition policy object may specify that access is to be granted to a resource up to X times in a defined period of time (e.g., X accesses per hour, day, week, etc.). It is to be understood that the exemplary conditions described above have been provided for purposes of illustration, rather than by way of limitation and that conditions policy objects may include other types of conditions that may be used to conditionally control access (e.g., granting, denying, restricting access) to the resources 150.

Application policy objects may be used to associate policies with applications, which are the vehicle through which the identities and/or dynamic groups interact with assets (e.g., the resources 150). Application policy objects may be configured with or include information that explains connections between a policy to which the application policy objects are assigned and the assets or entitlements.

As can be appreciated from the foregoing, combinations of various ones of the policy objects described above may be used to define robust policies for controlling access to the resources 150. As an illustrative example, supposed that an organization includes various departments or groups, including a research department, and that the resources 150 include various types of databases, applications, user interfaces, and other types of resources. Using the functionality of the policy administrator 121, a set of namespace policy objects may be defined for the organization, where the namespaces organize the various entities and resources of the organization into a hierarchy, which may be expressed as:

```
Organization {
    Research {
        Resources}
}
```

In the example namespace shown above, the "Organization" namespace represents a top level namespace (e.g., a company, etc.), "Research" represents a namespace for a group or sub-unit within the "Organization" (i.e., a research department of the company), "Resources" represents a namespace for resources for which access control is to be governed by the policy with respect to the "Research" namespace. It is noted that the exemplary namespace hierarchy shown above may include additional levels if desired (e.g., additional divisions or sub-units of the "Organization" other than the "Research" group, etc.) depending the particular organization and policies being designed.

Furthermore, each namespace within the above-identified hierarchy may be configured with additional information using other policy objects described above to specify information that may be used to configure and/or enforce access policies. For example, the "Research" namespace may be further configured with identity policy objects to identify a set of users belonging to or associated with the "Research" namespace and other attributes. Exemplary types of information that may be included in the identity policy objects of the "Research" namespace are shown in Table 1 below:

TABLE 1

| Group | Role | User |
|---|---|---|
| Research_Lab | Research_Lab-researchbiologist | test.research-dev1@abc.com |
| Research_Lab | Research_Lab-labtechnician | test.research-dev2@abc.com |
| Chemistry_Lab | Chemistry_Lab-researchchemist | test.research-dev3@abc.com |
| Chemistry_Lab | Chemistry_Lab-labtechnician | test.research-dev4@abc.com |
| Chemistry_Lab | Chemistry_Lab-labtechnician | test.research-dev5@abc.com |
| Chemistry_Lab | Chemistry_Lab-director | user1@abc.com |
| Research_Lab | Research_Lab-director | user2@abc.com |

As shown in Table 1 above, identity policy objects may be defined with attributes that specify the "Research" division of the "Organization" includes 2 different user groups (e.g., Research Lab and Chemistry Lab), 6 different user roles (e.g., Research Lab biologist, Research Lab technician, Chemistry Lab research chemist, Chemistry Lab technician, Chemistry Lab director, and Research Lab director), and user identifiers (e.g., the "Users" column of Table 1) for individual users corresponding to each group and role. In addition to the attributes shown in Table 1 above, other types of attributes may also be defined using identity policy objects. For example, identity policy object attributes can be used to group identities dynamically at the time of an access request in addition to or in the alternative to using static group identifiers (e.g., based on the groups or roles attributes of Table 1). As a non-limiting example, identity policy objects may include attributes to associate users with other dynamic group attributes that are different from those of Table 1 above, as shown in Table 2 below.

TABLE 2

| Group | Role | Dynamic Group |
|---|---|---|
| Chemistry_Lab | Chemistry_Lab_Researchchemist | ChemistryLab-LabTechnician |
| Chemistry_Lab | Chemistry_Lab-LabTechnician | ChemistryLab-Researchchemist |
| Research_Lab | Research_Lab-director | Director |
| Chemistry_Lab | Chemistry_Lab-director | Director |
| Research_Lab | Research_Lab-researchbiologist | Research_Lab-LabTechnician |
| Research_Lab | Research_Lab-labtechnician | Research_Lab-ResearchBiologist |

As can be seen in Table 2, the roles of Research Lab director and Chemistry Lab director may be consolidated into a dynamic group (e.g., Director), thereby enabling policies to be applied to users associated with the "Research" namespace based on whether the user is a director and irrespective of whether that user is the director of the Research Lab or Chemistry Lab.

The identity policy objects may include other attributes, such as usage settings that specify whether the attributes can be used in policies, conditions, access requests, and email notifications. The attributes may also specify how identities are named in a request and a parameter type for doing so. To illustrate, the attributes may specify that identities are specified as a string parameter type and whether identities can be specified using groups (e.g., one or more of the groups shown in Table 1), roles (e.g., one or more of the roles shown in Table 1), or dynamically (e.g., one or more of the dynamic groups shown in Table 1). Other attributes that may be included in attributes of identity policy objects (e.g., JSON paths, name of claim data, etc.) depending on the particular configuration of the system 100. Incorporating the identity policy objects into the namespace hierarchy shown above may result in the identity policy objects being included within the "Research" namespace, as shown below:

```
Organization {
    Research {
        Identities{
            Attributes}
        Resources }
}
```

UIs. The namespace hierarchy may be refined to include namespaces for each individual resource, which, as a non-limiting example, may result in:

```
Organization {
    Research {
        Identities{
            Attributes}
        BigQuery
        SQL
        UIs}
}
```

It is noted that in the example above, the asset policy objects "BigQuery", "SQL", and "UIs" may include additional information defined as attributes (e.g., attributes of the corresponding resource) or using other types of policy objects, such as action policy objects (e.g., actions that may be performed with respect to the resource) and condition policy objects (e.g., rules for enforcing any restrictions or denial of access for the resources). For example, the "BigQuery" namespace may be defined to include information related to datasets, table names, actions, assets, rules, or other factors. As a non-limiting example, the "BigQuery" namespace may include the following:

```
BigQuery {
    bigquery_table{
        Attributes: dataset_name, table_name
        Actions: View}
    bigquery_table_attributes{
        Attributes: dataset_name, table_name, column_name, column_value,
mask_column_name, mask_column_value
        Actions: Mask-Cell, Mask-Column, Mask-Row, Restrict-Column}
    Assets{
        dm_research.dm_assay
        dm_research.dm_compound
        dm_research.dm_compound_pubchem
        dm_research.dm_compound_side_effect
        dm_research.dm_hgnc_gene
        dm_research.dm_target
        dm_research.dm_target_core
        dm_research.dm_target_go
        dm_research.dm_uniprot_target}
    Rules{
        target_chembl_id-columnvalue
        molecule_chembl_id-columnvalue
        target_chembl_id-column
        canonical_smiles-column
        molecule_chembl_id-column
        target_pref name-column
        dm_assay-table
        dm_compound-table
        dm_target_core-table
        dm_research-dataset
        maskvalue
        canonical_smiles-maskcolumn}
    Dynamic Lists{
        dm_research.dm_assay-target_chembl_id-mask
        dm_research.dm_compound-canonical_smiles-mask
        dm_research.dm_compound-molecule_chembl_id-canonical_smiles-mask
        dm_research.dm_target_core-target_pref_name-column}
}
```

Continuing with the example above, the "Resources" namespace may be expanded to include namespaces and additional policy objects for each resource for which policy based access control may be desired. For example, the resources 150 for which policy based access control may be desired may include one or more databases, such as Big-Query database 154, SQL database 154, and one or more In the exemplary "BigQuery" namespace shown above, "bigquery_table" provides a template for policy-based access decisions, where such decisions may be based on the specified attributes (e.g., dataset_name, table_name) and actions (e.g., view). For example, a request to access the resource associated with the "dataset_name" and "table_name" may be granted or denied based on the action (e.g., whether the request is a request to "view" data or not). The "Assets" (e.g., dm_research.dm_assay, dm_research.dm_compound, dm_research.dm_compound pubchem, dm_research.dm_compound_side_effect, dm_research.dm_hgnc_gene, dm_research.dm_target, dm_research.dm_target_core, dm_research.dm_target_go, dm_research.dm_uniprot_target) represent asset policy objects corresponding to portions of the BigQuery data 154 for which access may be controlled according to the "bigquery_table" template. To illustrate, if a request is received to view portions of the BigQuery data 154 identified by the "Assets" then access may be granted, but if the request is not a request to view data or does not identify portions of the BigQuery data 154 identified by the "Assets" then access may be denied.

Similarly, "bigquery_table attributes" provides a template that specifies information for policy resolution decisions (i.e., what information is returned when access is granted). The "bigquery_table attributes" specifies attributes that may be used to resolve a policy decision, as well as actions that may be enforced when resolving the policy decision. For example, where an access request is granted, the information returned in response to the request may be limited to portions of the data identified in the attributes according to the specified actions. Similarly, "Dynamic Lists" may include groups of "Rules" that may be applied at runtime to objects meeting criteria for each rule of the collection, thereby enabling combinations of rules to be applied when appropriate conditions are met and providing increased flexibility to control access on individual rules or combinations of rules that may afford more complex access control.

Additionally, the "Rules" may be defined using the "bigquery_table attributes" template and may specify parameters that may be matched to attribute values for triggering various ones of the actions specified in the "bigquery_table attributes" template. For example, a rule may be configured to match a parameter in a request for access with one of the attributes of the "bigquery_table attributes" template and if a match is found, one or more of the actions from the "bigquery_table attributes" template may be used to control how access is provided, such as to mask column names, mask column values, and the like. It is noted that a namespace for the "SQL" data may be defined in a manner similar to that of the "BigQuery" namespace described above, but with different attributes, rules, etc. according to the "SQL" data namespace and supported assets (e.g., database tables, etc.).

Additionally, the "UI" namespace may also include additional information for controlling access to or presentation of UIs and UIEs according to one or more policies. For example, the "UI" namespace may include a template identifying UI attributes identifying one or more UIs and actions for the one or more UIs (e.g., display UIEs, disable UIEs, remove or hide UIEs, etc.), or other information. In some aspects, asset policy objects may be used in the "UI" namespace to define UI configurations according to other namespace configurations, such as to configure particular UIs to display data according to a configuration specified in the "BigQuery" or "SQL" namespaces. It is noted that other namespaces and namespace details may be defined in a manner similar to that described above to define a domain for which access control may be provided by one or more policies.

Using the information contained in the namespace hierarchy in the example above, a user may define an access control matrix configured to control access to various ones of the resources 150. For example, an access control matrix for accessing the BigQuery database 154 may be defined using the information from the "BigQuery" namespace, as shown in FIG. 4A, and control matrix for access policy resolution with respect to requests for access to the BigQuery database 154 is shown in FIG. 4B. As shown in FIG. 4A, the access control matrix may identify identities on a group basis (i.e., top row), a roles basis (i.e., second row), and may identify various portions (e.g., tables) of the BigQuery database 154 (i.e., first column, third through eight rows) for which access is to be controlled. Each role may be associated with a different column, such as the second column being associated with the Research Lab-director, the third column being associated with Research_Lab-researchbiologist, the fourth column being associated with Research_Lab-labtechnician, the fifth column being associated with the Chemistry Lab-director, the sixth column being associated with Chemistry_Lab-researchchemist, and the seventh column being associated with Chemistry_Lab-labtechnician. Using the access control matrix shown in FIG. 4A, access may be controlled according to the specified values (e.g., a value of "Y" indicates the corresponding role or group is permitted access and a value of "N" indicates the corresponding role or group is not permitted access). Thus, for example, a user assigned the role of Research_Lab-director or Chemistry_Lab-director may be permitted to all portions of the BigQuery database 154 identified in the access control matrix (e.g., dm_assay, dm_compound, dm_compound_pubchem, dm_compound_side_effect, dm_hgnc_gene, dm_target, dm_target_core, and dm_target_go), while users associated with the roles Research_Lab-researchbiologist and Research_Lab-labtechnician may be permitted access to fewer portions of the BigQuery database 154 (e.g., dm_assay, dm_hgnc_gene, dm_target, dm_target_core, and dm_target_go for the Research_Lab-researchbiologist, and dm_assay, dm_target, and dm_target_core for the Research_Lab-labtechnician). As will be described in more detail below, the various access controls specified in the access control matrix shown in FIG. 4A may be used to determine whether to grant or deny access when a user requests access to the BugQuery database 154.

Similarly, upon determining to grant access based on the access control matrix shown in FIG. 4A, the access may be conditions or resolved according to the requirements provided in the policy resolution matrix shown in FIG. 4B. For example, access for the Research_Lab-labtechnician is restricted for an entire column (e.g., target_pref_name) in a particular portion or table (e.g., dm_target_core) of the BigQuery database 154. Similarly, a particular cell may be masked when accessed by a user having the role of Chemistry_Lab-researchchemist, where the particular cell is specified as a condition (e.g., 'molecule_chjembl_id'=='CHEMBL1535', column name 'canonical smiles'), and where the masking of the cell replaces the value with the term "RESTRICTED". As noted for the Chemistry_Lab-director and Research_Lab-director roles, full access may also be given, thereby enabling users associated with these roles to have unrestricted access to the designated portions of the BigQuery database 154. It is noted that the particular roles, groups, tables, and access restrictions shown in FIGS. 4A and 4B have been provided by way of non-limiting examples to further illustrate how the various policy objects described above may be used to define access policies in accordance with the concepts disclosed herein. Accordingly, it should be understood that access control policies may be defined for other types of groups, roles, and databases, as well as using other types of restrictions according to the particular system for which the concepts disclosed herein are applied.

Referring to FIGS. 4C and 4D, similar access control and policy resolution matrices are shown for access to other ones of the resources 150, such as the relational database 153. In particular and by way of non-limiting example, FIG. 4C illustrates an access control matrix specifying whether access is to be granted or denied for tables of a relational database including four tables (e.g., gene_pathway-involvement, gene_process_involvement, gwas_signal, and gwas_signal_fine_mapping) and FIG. 4D specifies what restrictions, if any, are to be applied when providing access to the various tables of the relational database. Similar to the policy resolution matrix of FIG. 4B, the policy resolution matrix shown in FIG. 4D specifies restrictions based on the different roles and may include restrictions with respect to particular rows, columns, and cells of the relevant data sources for each different user role.

As briefly described above, access control in accordance with the present disclosure may also be utilized to control access to user interfaces or UIEs within an interface. Using the information from the UI namespace described above, an access control matrix for controlling access to various UIs or UIEs may be defined as shown in FIG. 4E. The UI access control matrix of FIG. 4E may be used to control access to various UIs (e.g., a main dashboard, a target dashboard, and a compound dashboard) for a particular identity (e.g., Research Lab and/or Research_Lab-researchbiologist). Thus, the UI access control matrix shown in FIG. 4E may be limited to providing access control with respect to the identified UIs for the particular identity. However, it should be understood other identities and UIs may be incorporated into the UI access control matrix or multiple UI access control matrices may be defined for controlling access to UIs for other identities.

As shown in FIG. 4E, the UI access control matrix may specify a set of UIEs for each UI, where the set of UIEs identified for each UI correspond to UIEs for which access is provide. Accordingly, it should be understood that any UIEs of the various UIs shown in FIG. 4E that are not specifically identified in the UI access control matrix may be hidden or disabled. Furthermore, it should be understood that different identities may be granted different types of UI access, such as to grant full access to the UIs for the director roles (e.g., Research_Lab-director and Chemistry_Lab-director), while other roles may be provided with other types of access, which may be the same as or different from that shown in FIG. 4E.

It is noted that the various access control matrices shown in FIGS. 4A-4E have been provided for purposes of illustration, rather than by way of limitation and that other types of access control matrices may be readily defined in accordance with the concepts disclosed herein. For example, while the access control matrices shown in FIGS. 4A-4E includes role-based access controls, it should be readily understood that access may be controlled in other ways, such as based on other identity information (e.g., based on groups, based on user identifiers, geographic regions, and the like) or other types of information that may be used to grant, deny, and/or restrict access to the resources 150.

The exemplary namespace templates shown above may be utilized to create a set of classes for creating access control policies. For example, the template for BigQuery shown above may serve as a class template for defining policies involving the BigQuery namespace. Instances of the BigQuery class may be created that inherit the actions, rules, resources (e.g., tables, etc.), and other information from the BigQuery class, but may be modified to impose more or less restrictions, control access to different resources, support different sets of actions, and the like. Furthermore, classes defined for various namespaces may be used in combination to rapidly define access control policies that control access to a diverse set of resources in an standardized manner that provides consistent enforcement of applicable or desirable access controls while also enabling customization of the default access controls in an ad hoc manner. For example, once the set of classes for a given access control policy is selected and tuned as desired, the information in the set of classes may be used to generate access control matrices for performing policy administration and resolution, such as the exemplary control matrices described above with reference to FIGS. 4A-4E. An additional advantage of utilizing class-like templates to provision access control policies is the ability to provide a central mechanism for modifying policies. For example, where access control policies are created using class-type objects in accordance with the concepts described above, modifications of those class-type objects, such as to configure additional tables, remove tables, modify table names, etc. may be modified in the class itself, and then those changes may be automatically propagated to access control policies formed from those class-type objects.

Referring back to FIG. 1, as shown above, the functionality provided by the policy administrator 121 enables users to create access control policies that enable a wide variety of control to be provided with respect to the resources 150. It should be understood that while the examples in FIGS. 4A-4E focus on access to databases and UIs, the functionality of the policy administrator 1212 may enable access control information to be defined for controlling access to applications or portions of applications (e.g., particular functionality of applications) and services, as described above with reference to FIG. 3F. Other types of access control may also be configured using the above-described functionality of the policy administrator 121 depending on the set of resources for which access control is to be provided. For example, access control may be specified for devices (e.g., printer), access to physical locations or spaces (e.g., integration of access controls for ingress and egress of rooms, buildings, etc.), access to computing devices (e.g., logging in to one or more computing or personal devices) or networks, or other resources for which access control may be desirable. Accordingly, the functionality of the policy administrator 121 is not to be limited to the specific and non-limiting examples described herein.

In an aspect, the one or more policy information points (PIPs) 125 may provide functionality for supporting the policy administrator 121. To illustrate, the PIPs 125 may be configured to collect and maintain information that may be utilized by the functionality of policy administrator 121 to facilitate the exemplary policy creation processes described above. For example, the PIPs 125 may maintain or collect information associated with the resources 150, authorized users, or other aspects of the system 100 for which access control may be provided. Exemplary information that may be maintained or collected by the PIPs 125 may include attribute information, identity information, geographic data, organizational data, and the like. The information collected and maintained by the PIPs 125 may be used to populate one or more UIs provided by the policy administrator 121, such as to present information associated with the resources 150 for selection during a policy creation process or other types of information that may be used to design and create access control policies in accordance with the concepts described herein.

In an aspect, the PIPs 125 may include individual PIPs for different types of information. For example, a PIP may be created for maintaining and collecting information associated with users, such as user attributes (e.g., group/role information identifying particular divisions or units within an organization to which users belong, demographic information, etc.), identity information (e.g., information used to identify users within the system 100, as described above with reference to Table 1, etc.), geographic data (e.g., information identifying one or more geographic locations associated with a user, such as the city where the user or office of the user is located, a geographic region associated with the user, etc.), organizational data (e.g., information associated with various divisions or units within the organization), or other types of information. Another PIP may be provided for maintaining and collecting asset information, such as asset identifiers (e.g., network addresses or other information identifying the resources 150), asset attributes (e.g., table names, row/column names, data types, locations, etc.), and the like. It is noted that other configurations of the PIPs 125 may also be utilized in accordance with the concepts disclosed herein, such as to organize PIPs according to geographic regions (e.g., different PIPs for North America, Europe, India, etc.) or based on other factors.

While the policy administrator 121 provides functionality for creating and defining access control policies that may be used to control access to the resources 150, components of the policy manager 120 other than the policy administrator 121 may be responsible for resolving and enforcing the provisions of the access control policies. In particular, functionality provided by the interceptor 122, the enforcer 123, the decision point(s) 124, and the tokenizer 126 operate in a coordinated fashion to resolve and enforce access control policies and policy requirements with respect to requests received from users, such as requests for access to the resources 150 received from the user devices 130.

The interceptor 122 provides functionality for detecting or intercepting requests to access various ones of the resources 150. Additionally, the functionality of the interceptor 122 is configured to cooperate with the policy decision point(s) (PDPs) 124 to coordinate access control with respect to the resources upon detecting or receiving a request to access one of the resources 150 and to facilitate policy resolution, if applicable, when access is permitted according to relevant policies. The PDP(s) 124 operates as authorization engine that provides functionality for determining access decisions based on parameters extracted from a request to access one of the resources 150 and a set of access control policies. For example, the one or more databases 118 may include a database of access control policies configured to control access to various ones of the resources 150 and the authorization engine of the PDP(s) 124 may use the extracted request parameters to identify one or more of the access control policies applicable to the request detected by the interceptor 122. The authorization engine evaluates the identified access control policy (or policies) to determine a policy response, which may indicate whether access to the requested resource is to be granted, denied, or restricted. The policy response is provided to the interceptor 122 where it may be passed to other functions or components of the system 100 for controlling access to the requested resource. For example, where the requested resource is data stored in a database (e.g., the relational database 153 or the BigQuery database 154), the policy response may be passed by the interceptor 122 to a data application programming interface (API) providing functionality for facilitating access to the data. It is noted that other types of components and functions may be utilized to provide access to the resources 150 and that a data API has been described by way of illustration, rather than by way of limitation.

Where the requested access is denied by the policy identified by the PDP 124, the policy response may be provided to the interceptor 122 and forwarded to the relevant system component of function, which may deny access based on the policy response. However, where access is to be granted (e.g., in full or on a restricted basis), the interceptor 122 provides the policy response indicating access is granted to the relevant system component of function and that component or function may initiate a policy resolution process. As described in more detail below, the policy resolution process may be utilized to configure access to the resource in a manner that complies with the relevant access control policy. To facilitate policy resolution, the interceptor 122 may detect the policy resolution request and may pass the policy resolution request to the PDP 124, which may in turn determine whether the access is subject to any restrictions. Once the restrictions are identified, if any, the PDP 124 may return a restriction response to the interceptor 122, which may in turn forward the restriction response to the relevant system component of function through which the access is to be provided.

Upon receiving the restriction response, the relevant system component or function transmits an enforcement request to the enforcer 123. The enforcer 123 provides functionality for modifying an initial request for access to the resource(s) 150 to a form that is compliant with the access control policies and any restrictions identified by the PDP 124. For example, where the request for access to the resource(s) 150 is a request to retrieve data from a database, the functionality provided by the enforcer 123 may generate a query for retrieving the relevant data in a manner that satisfies any applicable restrictions.

The tokenizer 126 provides functionality for facilitating generation of queries in compliance with applicable access restrictions. For example, the enforcement request received by the enforcer 123 may include a query generated at the user device (e.g., via an application for retrieving data from the databases 153, 154 or another data source). The functionality of the tokenizer 126 is configured to convert the query into a set of tokens and assign each token a label. In an aspect, the tokenizer 126 may be part of the enforcer 123. In additional or alternative aspects, the tokenizer 126 may be a separate component or function of the policy manager 120, the enforcer 123, and/or the access control device 110.

Once generated, the set of tokens and corresponding labels are used by the functionality of the enforcer 123 to rewrite the query to a form that complies with the applicable restrictions. To facilitate rewriting of queries based on the set of tokens and corresponding labels, the enforcer 123 includes functionality for performing lexical analysis to identify various portions of the resource for which access is to be provided (e.g., columns, tables, rows, and the like for database resources; UIs and UIEs for application or service resources; etc.) and associations or relationships between the different portions of the resource(s). The functionality of the enforcer 123 also includes query building functionality to rewrite the query based on applicable restrictions using the identified portions of the resource(s) and associativity therebetween, as well as the set of tokens and corresponding labels. Once the query is rewritten to a form that enforces the relevant restrictions specified by the access control policy, the functionality of the enforcer 123 may parse and validate the rewritten query. In an aspect, parsing and validating the rewritten query may be performed differently depending on a type of resource being accessed. For example, queries of the relational database 153 and queries of the BigQuery database 154 may utilize different query syntaxes, different database properties (e.g., table formats, data sizes, etc.), or other factors. Accordingly, validation of the rewritten query may be performed differently depending on the database to which the query pertains. Once the rewritten query is validated, the enforcer 123 may return the rewritten query to relevant function or component for providing access to the requested resource, which may then run the query against the appropriate data source to retrieve and present the requested data to the user (e.g., via a UI presented at a display device of the user device 130).

It is noted that while the functionality of the enforcer 123 is primarily described above with respect to accessing data in a database, the enforcer 123 may also provide functionality for enforcing restrictions on other ones of the resources 150, such as restrictions on access to UIs, UIEs, and applications, as described above with reference to FIGS. 3C and 3F, as well FIG. 4E. Furthermore, it should be understood that the functionality of the enforcer 123 may be used to enforce access control provisions with respect to other types of resources if desired in accordance with the concepts described above and elsewhere herein. Additional aspects of the functionality provided by the enforcer 123 are described in more detail below.

As can be appreciated from the foregoing, utilizing the exemplary process described above with reference to the policy administrator 1212, the interceptor 122, the enforcer 123, the PDPs 124, 125, and the tokenizer 126 provides several advantages over existing access control systems. For example, by intercepting and processing requests to access the resources 150 using the techniques described above, a user may not be connected to the resource until after policy administration (e.g., a decision to grant, deny, restrict access) and policy resolution (e.g., enforcing restrictions of the policy) have been configured.

Figure 5:
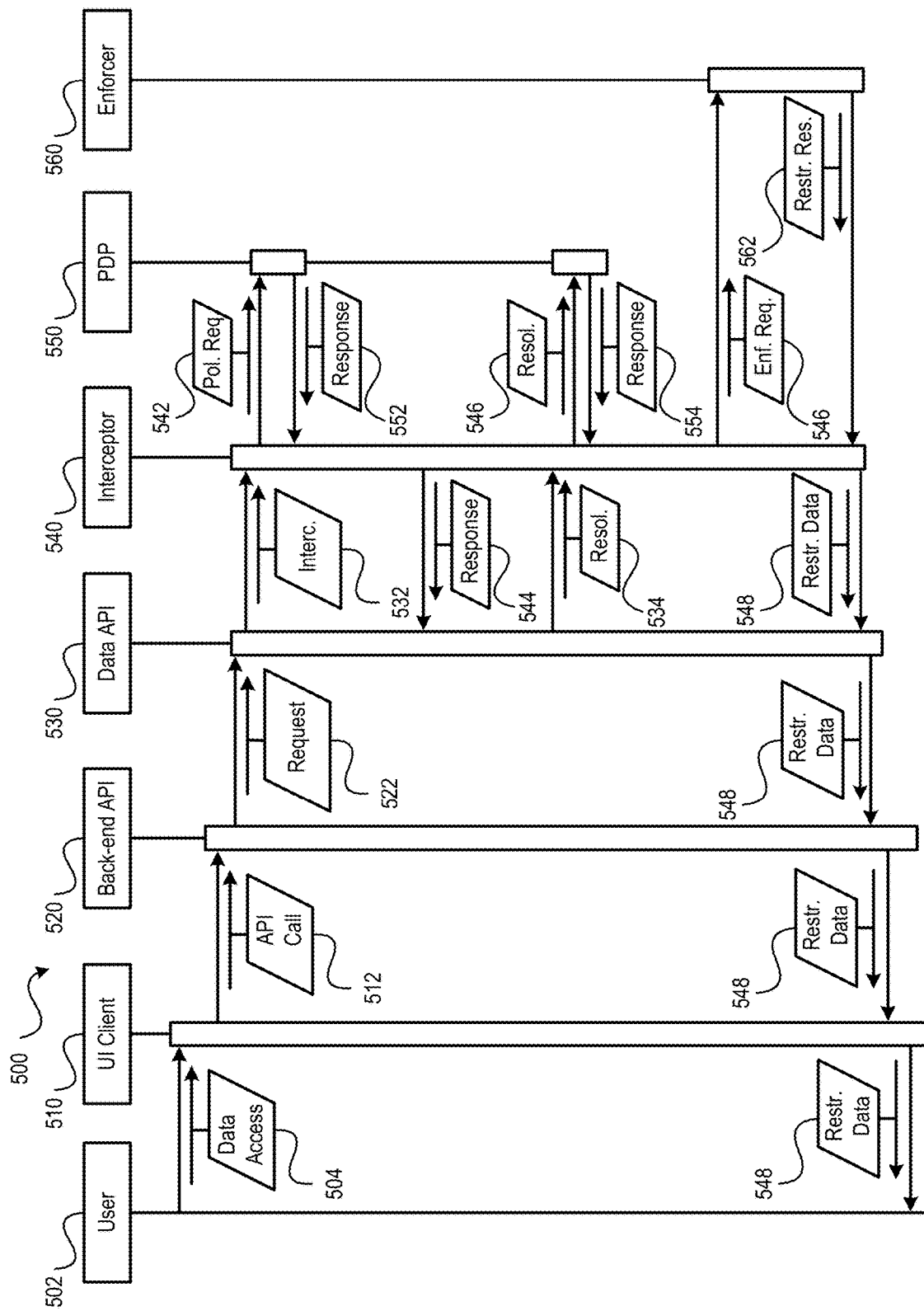
FIG. 5 is a ladder diagram illustrating an exemplary messaging flow for providing access control according to one or more aspects of the disclosure.

Referring to FIG. 5, a ladder diagram illustrating an exemplary messaging flow for providing access control in accordance with the present disclosure is shown as messaging flow 500. It is noted that the exemplary messaging flow 500 shown in FIG. 5 illustrates providing access control via a variety of devices, interfaces, and other computing resources, shown in FIG. as including: a user device 502, a UI client 510, a back-end application programming interface (API) 520, a data API 530, an interceptor 540, a policy decision point (PDP) 550, and an enforcer 560. In an aspect, the user device 502 may correspond to the user device 130 of FIG. 1, the interceptor 540 may be the interceptor 122 of FIG. 1, the PDP 550 may correspond to the decision point 124 of FIG. 1, and the enforcer 560 may correspond to the enforcer 123 of FIG. 1. It is to be appreciated that the exemplary devices, interfaces (e.g., APIs), and computing resources shown in and described with reference to FIG. 5 have been provided by way of illustration, rather than by way of limitation. Accordingly, it should be understood that messaging flows used to provide access control with respect to resources in accordance with the present disclosure may include more or less messages that are shown in the messaging flow 500, but such alternative messaging flows may perform policy administration (e.g., determining to grant, deny, or restrict access) and resolution (e.g., enforcing restrictions on access to one or more resources) in a manner that is substantially similar to or the same as the messaging flow 500.

As shown in FIG. 5, the messaging flow 500 may begin with the user device 502 initiating a data access request 504 to the UI client 510. The data access request 504 may be initiated via inputs provided to the UE client 510 (e.g., a user interface or application) using one or more input devices (e.g., one or more of the I/O device 140 of FIG. 1). As a non-limiting example, the UI client 510 may provide a query builder tool that enables the user to configure queries for retrieving data of interest. As such, the data access request 504 may include information for querying a database in which the data of interest is stored, such as one of the relational databases 153, the BigQuery database 154, or another data source. In response to receiving the information for the data access request 504, the UI client 510 may initiate an API call, shown in FIG. 5 as a request 522, to the back-end API 520. The back-end API 520 provides an interface enabling the UI client 510 to access back-end services, such as a service enabling the data of interest to be retrieved from a server (e.g., a database server storing the data of interest). The back-end API 520 may issue a request 522 to the data API 540, which may be an API configured to provide the requested access, such as to retrieve data of interest from a data store based on the access request.

As briefly described above, the functionality of the interceptor 540 is configured to provide policy administration (e.g., a determination to grant or deny access based on an access control policy) and policy resolution (e.g., a process to configure the manner in which access that has been granted is provided based on the access control policy) with respect to access requests. In the exemplary messaging flow 500, for example, the interceptor 540 detects the request to access resources based on the request 532 transmitted to the interceptor 540 by the data API 530. Additionally or alternatively, the interceptor 540 may detect the requested access using other techniques, such as by monitoring network traffic for access requests transmitted to the data API 530 or other system components.

Upon detecting a request for which access control functionality is needed, the interceptor 540 may initiate a policy administration process to determine whether access to one or more resources (e.g., one or more of the resources 150 of FIG. 1) is authorized in accordance with one or more access control policies. For example and as shown in FIG. 5, the interceptor 540, upon detecting the request 532, transmits a request 542 (e.g., a policy administration request) to the PDP 550. The PDP 550 provides an authorization runtime engine that facilitates policy administration and resolution for controlling access to various resources. In the example of FIG. 5 where the user is attempting to retrieve the data of interest from a data source, the policy administration functionality provided by the authorization runtime engine of the PDP 550 identifies one or more access control policies applicable to the requested access, and then determines whether the requested access is granted or denied based on the one or more access control policies.

The policy administration process for determining whether to grant or deny the requested access may be based, at least in part, on information included in the request 542. For example, the request 512 generated by the UI client 510 may include a set of parameters for identifying one or more applicable access control policies and for determining whether the requested access is to be granted or denied using the identified policy (or policies). Exemplary information or parameters used for identifying relevant access control policies and determining policy administration outcomes may include: user information, such as a user identity, a user role, a user group, or other information that may be used to identify who is requesting access; asset information, such as information identifying the resource(s) 150 for which access is requested (e.g., a database, one or more tables of the database, portions of the database such as rows, columns, cells, and the like, or other information); information identifying one or more actions to be performed with respect to accessing the requested resource(s) 150 (e.g., view, modify, delete, create, etc.), or other types of information. It is noted that exemplary parameters described above have been provided by way of illustration, rather than by way of limitation and that other types of parameters or combinations of parameters may be provided to the PDP 550 depending on the configuration of the PDP 550, the policies, and/or the requests used to provide the parameters to the PDP 550.

The authorization runtime engine uses at least some of the parameters passed to the PDP 550 in the request 542 to identify one or more access control policies governing whether access is to be permitted or denied with respect to the request 512. In an aspect, the PDP 550 may retrieve the one or more access control policies from an access control policy database, which may be a database included in the one or more databases 118 of FIG. 1. In an additional or alternative aspect, the PDP 550 may retrieve the one or more access control policies from a PIP (e.g., the PIPs 125 of FIG. 1), as described above. Other techniques may also be used by the PDP 550 to identify and retrieve the relevant access control policy. Subsequent to identifying the access control policy pertaining to the requested access, the PDP 550 transmits a response 552 to the interceptor 540. In an aspect, the response 552 includes information indicating whether the requested access is to be granted or denied. To illustrate, the identified access control policy may include an access control matrix (e.g., the access control matrix shown in FIG. 4A or FIG. 4C) that is used by the PDP 550, along with one or more of the parameters passed to the PDP 550 in the request 542, to determine a policy administration decision (e.g., a determination as to whether access is granted or denied under the access control policy). As a non-limiting and illustrative example, suppose that the parameters in the request 542 indicate the user associated with the request is test.research-dev1 (test.research-dev1@abc.com) from Table 1 above, and that request is a query of information included in the BigQuery database 154 of FIG. 1. As explained above, test.research-dev1 is a member of the group Research_Lab and has been assigned the role of Research_Lab-researchbiologist. Using this information and the access control matrix of FIG. 4A, the authorization runtime engine may determine whether the user is authorized to access the relevant portions of the BigQuery database 154. In particular and according to the access control matrix of FIG. 4A, if the query seeks to obtain information from the dm_assay, dm_hgnc_gene, dm_target, dm_target_core, or dm_target_go tables of the BigQuery database 154 then the policy administration decision may be configured to grant access (e.g., because the access control matrix of FIG. 4A indicates users in the group Research_Lab and having the role of Research_Lab-researchbiologist are authorized to access those tables), but if the query seeks to obtain information from other tables of the BigQuery database 154 then the policy administration decision may deny access.

The policy administration decision determined by the PDP 550 is provided to the intercept 540 as a response 552, and the interceptor 540 passes the response 552 to the data API 530, shown in FIG. 5 as response 544. If access is denied, the data API 530 may transmit a response (not shown in FIG. 5) to the UI client 510 via the back-end API 520 to indicate the requested access is not authorized and the UI client 510 may display an appropriate message to the user of the user device 502. However, if access is granted, the data API 430 may transmit a request 534 to the interceptor 540. The request 534 may be a request for policy resolution and the interceptor 540 may pass the request 534 to the PDP 550 as a policy resolution request 546. As described above with reference to FIGS. 4B and 4D, the PDP 550 may determine one or more restrictions or conditions to be imposed on the access to the relevant resource(s) 150 based on information included in a policy resolution matrix identified as relevant to the request access.

The PDP 550 provides a response 554 to the interceptor 540 based on evaluation of the applicable policy resolution matrix and parameters of the requested access. The response 554 may specify various restrictions that are to be applied when providing access to the resource(s) corresponding to the requested access, as described above with reference to FIGS. 3C-3F, 4B, 4D, and 4E. As a non-limiting example, suppose the access request involved the table dm_target_core and the user was a member of the group "Research Lab" and associated with the role "Research Lab"-labtechnician. In such a situation the policy resolution decision may be based on the policy resolution matrix of FIG. 4B and the response 554 may indicate that the entire column target_pref_name should be restricted when providing access to the user.

As shown in FIG. 5, where the access policy authorizes access with constraints, the interceptor 540 transmits an enforcement request 536 to the enforcer 560. As briefly described above and in more detail below, the enforcer 560 may be configured to generate a restricted access response 562 that is returned to the interceptor 540. The enforcement request 536 is configured to control how access to the resource(s) associated with the requested access is provided. For example, where the request involves a request for data, the restricted access response 562 may modify a query for retrieving the data from the relevant database(s) in a manner that enforces any restrictions on access to the relevant database(s), such as to hide columns, rows, specific values, or other types of restrictions applicable to the retrieval of the data of interest from the database(s) in a manner that complies with the identified provisions of the policy resolution matrix, as may be specified in the response 554 (e.g., in the example above the restricted access response may modify a query involving the dm_target_core table of the BigQuery database 154 to restrict or hide the column target_pref_name when returning data to the user).

The interceptor 540 receives the restricted access response 562 and uses the restricted access response 562 to retrieve the requested data from the database(s). Once the data is retrieved from the database in accordance with the rewritten query in the restricted access response 562, the interceptor 540 provides the retrieved data as restricted data 548 to the data API 530. In some aspects, the enforcer 560 may execute the rewritten query, rather than simply providing the rewritten query (or other restriction data) to the interceptor 540 for execution, which may improve response times and provide for more efficient processing (e.g., due to less signaling and messages). The data API then provides the restricted data 548 to the back-end API 520. Similarly, the back-end API 520 may pass the restricted data 548 to the UI client 510 for display (or another form of output) at the user device 502. It is noted that while shown in FIG. 5 as restricted data 548, in other examples the data returned by the data API in response to a request may include other types of restrictions, such as UI restrictions (e.g., as described above with reference to FIGS. 3C and 4E), or may not include any restrictions (e.g., when access to the data is full access, as described above with reference to the director roles and FIGS. 4B and 4D). Furthermore, where no restrictions are imposed on the access, such as if the user associated with the query is one of the directors described above with reference to FIGS. 4A-4D, a restricted access response may not be issued and instead all relevant data for the query may be returned to the user client 510 (e.g., the interceptor 540 may return a grant/deny access request directly to the data API 530 since no restrictions are imposed on the access and the enforcer 560 may not be involved).

It is noted that the exemplary messages and processes described above have been provided for purposes of illustration, rather than by way of limitation and that other messaging sequences and processes may be readily utilized to control access and enforce restrictions on access to resources in accordance with the concepts described herein. For example, while policy administration and resolution processes are shown in FIG. 5 as involving communications between the interceptor 540 and the PDP 550, in some implementations, the interceptor 540 may be configured to use the information or parameters in requests to retrieve relevant access control policies and determine whether access is to be granted and any applicable restrictions to be imposed on such access. As another example, the policy administration and resolution decisions may return the relevant access control policies themselves to the data API 530, such as to return the access control matrix and policy resolution matrix applicable to the requested access and the data API 530 may include those access control policies in the enforcement request 536. In such an implementation the decision to grant or deny access may be determined by the enforcer 560 and the restricted access response 562 may indicate whether the access is granted or denied and where access is granted, may include any modifications to the requested access according to any applicable restrictions.

While exemplary messaging and processing flows have been described above to demonstrate how the interceptor 540 and enforcer 560 can be used to provide a centralized enforcement layer within an access control system, it should be understood that enforcement layers utilizing the interceptor 540 and enforcer 560 may be readily designed using other processing and messaging sequences to control access to resources in accordance with the concepts described herein. Furthermore, it is noted that the functionality and operations described above with reference to FIG. 5 may include additional operations and functionality not explicitly described or shown in FIG. 5 for simplicity of the drawing. For example, functionality of the tokenizer 126 of FIG. 1 may be leveraged by the interceptor 540 and/or the enforcer 560 to interpret or extract information from the access request for use in making policy administration and resolution requests and/or enforcement of policy administration and resolution outcomes, as described in more detail below. Additionally, it is noted that while the exemplary access request described in connection with FIG. 5 involves a request to access a data source, the operations of FIG. 5 may also be utilized to provide policy based access control for other types of resources, such as authorizing use of an application and enforcing restrictions on the use and/or features of the application, authentication of users upon logging into a user device, or other use cases for which policy based access control may be provided.

Figure 6A:
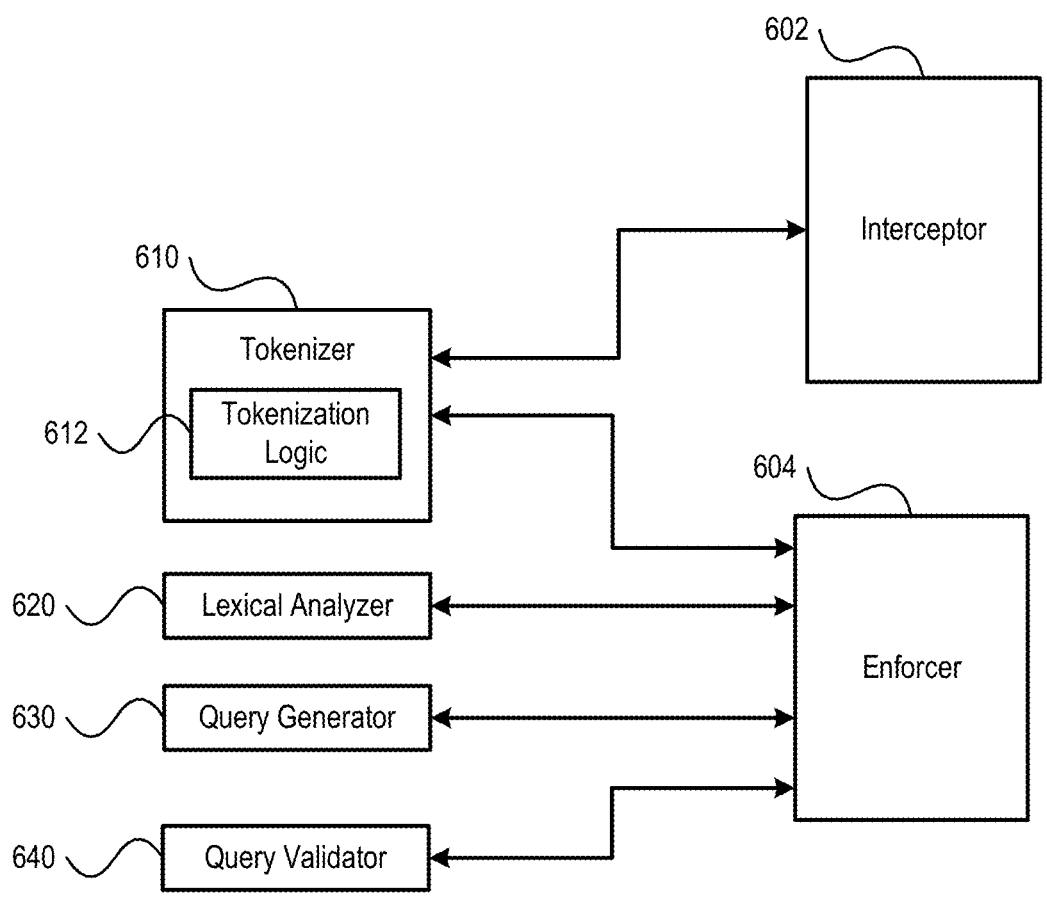
FIG. 6A is a block diagram illustrating exemplary operations for performing policy administration and policy resolution according to one or more aspects of the disclosure.
Figure 6B:
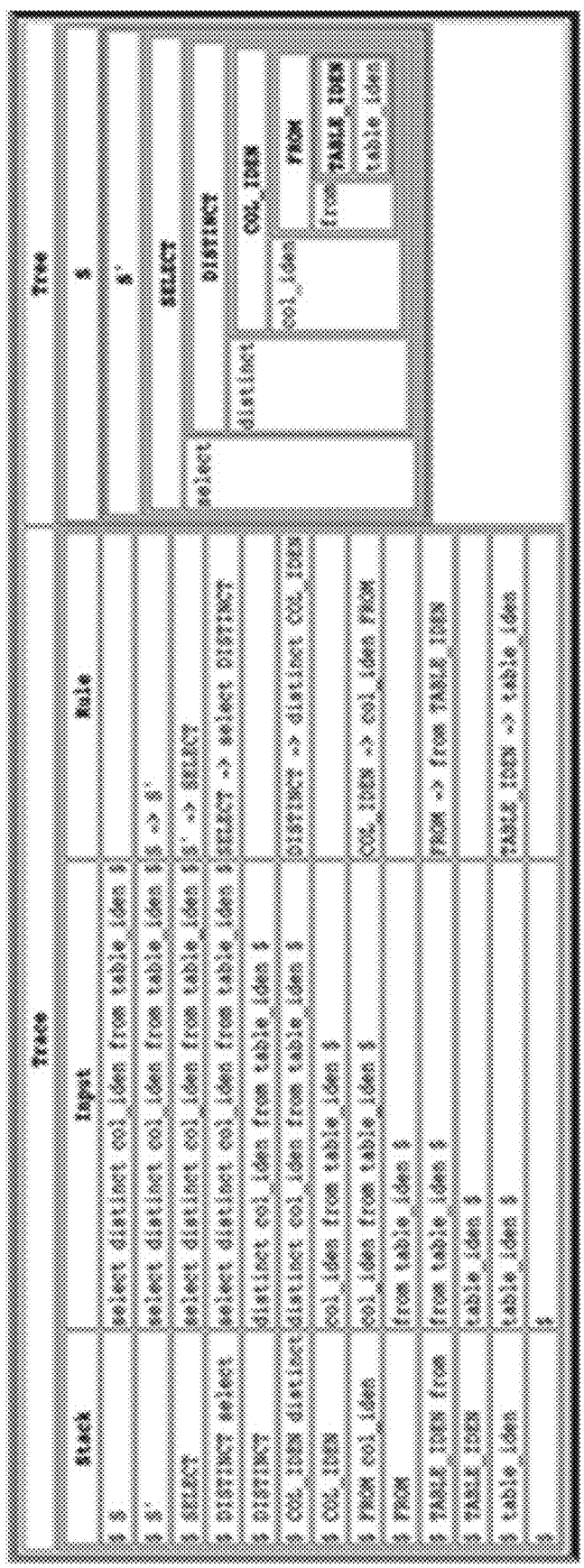
FIG. 6B is a diagram illustrating aspects of using a parsing table to validate enforcement of policy restrictions on an access request according to one or more aspects of the disclosure.

To further illustrate exemplary aspects of the messaging flow 500 and referring to FIG. 6A, a block diagram illustrating exemplary operations for performing policy administration and policy resolution in accordance with the present disclosure is shown. In FIG. 6A, an interceptor 602 and an enforcer 604 are shown. The interceptor 602 may be the interceptor 122 of FIG. 1 or the interceptor 540 of FIG. 5, and the enforcer 604 may be the enforcer 123 of FIG. 1 or the enforcer 560 of FIG. 5. Additionally, FIG. 6 include a tokenizer 610, a lexical analyzer 620, a query generator 630, and a query validator 640. The tokenizer 610 may be the tokenizer 126 of FIG. 1.

As briefly described above, tokenizers of embodiments of the present disclosure may be utilized to extract information from access requests, such as to extract information from a query of a data source. The extracted information may be used for a variety of purposes, such as to capture information that may be used by the interceptor 602 to perform policy administration and resolution (e.g., as described above with respect to messaging flow 500 of FIG. 5) or to enable the enforcer 604 to configure responses controlling how requested access to resources is provided. As shown in FIG. 6, the tokenizer 610 includes tokenization logic 612 providing functionality to facilitate tokenization of information included in access requests. In the description below, exemplary operations utilized by the tokenization logic 612 of tokenizer 610 to perform tokenization of access request information are described with reference to tokenization of a query. However, it should be understood that the tokenization operations may be readily applied to other types of information that may be included in access requests.

As described above with reference to FIG. 5, a user seeking to retrieve data of interest from a data source, such as the relational database 153 of FIG. 1, BigQuery database 154 of FIG. 1, or another data source, may utilize an application to request access to or retrieve the data of interest. The request may include a query, which may be built by the user or by functionality of the application based on inputs provided by the user, providing parameters for identifying the data of interest within the data source. As an non-limiting example, the query may be defined using structure query language (SQL) and may include a sequence of commands. Each command may be composed of a sequence of tokens and be terminated by a semicolon (";"). Within a command tokens may be separated by whitespace (e.g., space, tab, newline, etc.). The end of the input stream may also terminate a command.

The tokenization logic 612 may be configured to analyze queries within access requests to identify the tokens and assign labels to the them. Exemplary labels that may be applied to tokens by the tokenization logic 612 include a keyword label, an identifier (e.g., a name) label, a quoted identifier label, a literal (or constant) label, operator label, a special character symbol label, or a comment label. As a non-limiting example, the keyword label may be applied to reserved words, which may be special tokens used in SQL or another query language. The tokenization logic 612 may apply the identifier label to tokens identifying names of tables, columns, or other database objects. The quoted identifier label may be applied to tokens within the query that are embedded within quotation marks ("token"), and literal labels may be applied tokens (e.g., strings and numbers) embedded within single quotes ('string'). The tokenization logic 612 may apply the operator label to tokens corresponding to special characters or symbols within the query, such as +, −, *, /, <, >, =, !, @, #, %, /\, &, |, ', and ?. Similarly, the special character symbol may be applied to other symbols within the query, such as parentheses "(" or ")", square brackets "[" or "]", commas ",", semicolons ";", colons ":", asterisks "*", and periods ".". The comment label may be applied to tokens within the query designated by special symbols, such as tokens following "--" or "/*" or tokens embedded between "/* */".

As an illustrative example, gen an access request having a query expressed as:

select qn from(select quartername qn from pv_insight_period) as base

Applying the tokenization logic 612 to the query above results in identification of tokens and their corresponding labels, as shown in Table 3 below.

TABLE 3

| Token | Label |
|---|---|
| select | Keyword |
| qn | Identifier |
| from | Keyword |
| ( | Punctuation |
| select | Keyword |
| quartername | Identifier |
| qn | Identifier |
| from | Keyword |
| pv_insight_period | Identifier |
| ) | Punctuation |
| as | Keyword |
| base | Identifier |

As an illustrative example, the identifiers with token position may be configured as a sequence of comma delimited values, such as (value-1, value-2, . . . , value-z), where each of the values in the sequence denotes a different structural position of the corresponding token. For example, the sequence of comma delimited values may include 5 values, where the first value in the sequence indicates query position, the second value indicates a subquery level, the third value indicates a subquery position, the fourth value indicates a column definition position, and the fifth value may indicate a nested function position. To illustrate, the example query shown above with reference to Table 3 includes 12 tokens arranged in sequence, each token arranged at a particular position within the sequence of the query (e.g., the token "select" is in position 0, the token "qn" is in position 1, and so on). While each of the tokens in the query is arranged in a particular position within the overall query, the positional arrangement of each token does not provide any context as to how those tokens are related within the overall structure of the query.

In contrast, the identifiers assigned to the tokens by the lexical analyzer 620 impart context to the relationships between the various tokens within the overall structure of the query. To illustrate and using the exemplary query from Table 3, the lexical analyzer 620 may assign identifiers as shown in Table 4 below:

TABLE 4

| Position | Identifier | Token |
|---|---|---|
| 0 | (0, 0, 0, 0, 0) | select |
| 1 | (0, 0, 0, 0, 0) | qn |
| 2 | (0, 0, 0, 0, 0) | from |
| 3 | (0, 1, 4, 0, 0) | ( |
| 4 | (0, 1, 4, 0, 0) | select |
| 5 | (0, 1, 4, 0, 0) | quartername |
| 6 | (0, 1, 4, 0, 0) | as |
| 7 | (0, 1, 4, 0, 0) | qn |
| 8 | (0, 1, 4, 0, 0) | from |
| 9 | (0, 1, 4, 0, 0) | pv_insight_period |
| 10 | (0, 0, 0, 0, 0) | ) |
| 11 | (0, 0, 0, 0, 0) | as |
| 12 | (0, 0, 0, 0, 0) | base |

As shown in Table 4 above, each of the tokens (e.g., last column of Table 4) may have a position (e.g., first column of Table 4), and an identifier (e.g., second column of Table 4) assigned by the lexical analyzer 620.

The exemplary identifiers assigned by the lexical analyzer 620 shown in Table 4 above are of the form (#, #, #, #, #, #), where the first value in the sequence indicates query position, the second value indicates a subquery level, the third value indicates a subquery position, the fourth value indicates a column definition position, and the fifth value may indicate a nested function position. As can be seen from the identifiers indicated above in Table 4, the tokens "select", "qn", "from", ")", "as", and "base" are assigned the identifier (0, 0, 0, 0, 0), indicating these tokens are part of a base or main query, while the tokens "(", "select", "quartername", "as", "qn", "from", and "pv_insight_period" are assigned the identifier (0, 1, 4, 0, 0), indicating these tokens are part of a subquery. More specifically, the 1 indicates the subquery is the first subquery, and the 4 indicates the first subquery starts at position 4 (e.g., the token "(" of the main query. As can be appreciated from the foregoing, while the identifiers associated with the overall sequence of tokens (e.g., left column of Table 4) may provide some information regarding the query under consideration, the identifiers assigned by the lexical analyzer 620 provide more insightful understanding of the query, such as indicating the presence of zero of more subqueries, the token position where each subquery (if present) starts, and other insights.

The lexical analyzer 620 is configured to evaluate and contextualize the tokens of the query during assignment of the identifiers. For example, the lexical analyzer may identify subqueries when a current token is left parenthesis "(" and the previous token is one of a predetermined set of tokens, such as the tokens shown in Table 5 below:

TABLE 5

| FROM |
|---|
| JOIN |
| INNERJOIN |
| FULLJOIN |
| FULLOUTERJOIN |
| LEFTJOIN |
| RIGHTJOIN |
| LEFTOUTERJOIN |
| RIGHTOUTERJOIN |

In the exemplary query shown above, the main query and first subquery level are shown below:

select qn from(FIRST_SUBQUERY_LEVEL) as base, where the first subquery level includes the nested query:

select quartername qn from pv_insight_period.

Using the exemplary contextual rules above and Table 5, it can be seen that the lexical analyzer 620 identifies the presence of the first subquery level when the current token under consideration by the lexical analyzer is "(", the prior token is "from". As such, the lexical analyzer may assign an identifier to the token "(" indicating it is associated with the first subquery level (i.e., (0, 1, 0, 0, 0) and set the start position as the positional arrangement of the token "(" within the overall query (i.e., ")" is the fourth token in the overall sequence of tokens in the query and therefore, the identifier assigned by the lexical analyzer is (0, 1, 4, 0, 0)). The lexical analyzer 620 assigns this identifier to all tokens of the first subquery level belonging to the same query.

In some aspects, a query may include multiple nested queries and may thus include more than one subquery level. In such instances a similar process may be used to identify additional subquery levels and each subquery level may be assigned a different value for the subquery level within the identifiers assigned by the lexical analyzer 620. For example, suppose that the query was of the form:

main query (first subquery level (second subquery level (third subquery level)))

In such an instance, tokens identified by the lexical analyzer as belonging to the "main query" may be assigned identifiers having a value of 0 for the subquery level portion of the identifier assigned by the lexical analyzer 620 and the positional value of the token within the overall sequence of tokens corresponding to the start position (A) of the token for the main query may be assigned as the subquery level start position portion of the identifier assigned by the lexical analyzer 620 (e.g., (0, 0, A, 0, 0). Similarly, tokens identified by the lexical analyzer as belonging to the "first subquery level" may be assigned identifiers having a value of 1 for the subquery level portion of the identifier assigned by the lexical analyzer 620 and the positional value of the token within the overall sequence of tokens corresponding to the start position (X) of the token for the first subquery (e.g., a subquery within the main query) may be assigned as the subquery level start position portion of the identifier assigned by the lexical analyzer 620 (e.g., (0, 1, X, 0, 0). Tokens identified by the lexical analyzer as belonging to the "second subquery level" may be assigned identifiers having a value of 2 for the subquery level portion of the identifier assigned by the lexical analyzer 620 (i.e., to indicate a second subquery level or the presence of a subquery within a subquery) and the positional value of the token within the overall sequence of tokens corresponding to the start position (Y) of the token for the second subquery level (e.g., a subquery within a subquery) may be assigned as the subquery level start position portion of the identifier assigned by the lexical analyzer 620 (e.g., (0, 2, Y, 0, 0); and tokens identified by the lexical analyzer as belonging to the "third subquery level" may be assigned identifiers having a value of 3 for the subquery level portion of the identifier assigned by the lexical analyzer 620 (i.e., to indicate a third subquery level or the presence of a subquery within a subquery within a subquery) and the positional value of the token within the overall sequence of tokens corresponding to the start position (Z) of the token for the third subquery level (e.g., a subquery within a subquery within a subquery) may be assigned as the subquery level start position portion of the identifier assigned by the lexical analyzer 620 (e.g., (0, 3, Z, 0, 0). As can be appreciated from the foregoing, the identifiers assigned by the lexical analyzer provide context for the presence of subqueries within a query received as part of an access request.

In addition to information regarding the presence of subqueries and as briefly described above, the identifiers assigned by the lexical analyzer 620 may also provide information regarding column definition position and nested function position within queries. Similar to the rules above, the lexical analyzer 620 may detect the presence of a column definition in the query if the current token is a left parenthesis "(" and the previous token is comma "," or a token from among the token shown in Table 6 below:

TABLE 6

SELECT
WHERE
ORDERBY
ON
SET

TABLE 6-continued

GROUPBY
JSON_EXTRACT_ARRAY
UNNEST
ARRAY
ARRAY_AGG
ANY_VALUE

As an illustrative example, suppose the query was given by:

select(select periodend where periodend=3), quartername from pv_insight_period

Using the exemplary rules described above, the lexical analyzer 620 may detect that the portion of the query "(select periodend where periodend=3)" is a column definition because the keyword token "select" from Table 6 precedes the current token "(". As explained above, the identifiers assigned by the lexical analyzer 620 may identify tokens associated with column definitions by configuring a particular value of the identifier to indicate the presence of a column definition, such as (0, 0, 0, D, 0).

The first value in the identifiers assigned by the lexical analyzer 620 (e.g., (W, 0, 0, 0)) may be used to indicate the presences of "with" query structures in a query received as part of an access request. "With" query structures may be identified by the lexical analyzer 620 when the current token is left parenthesis "(" and the previous token is not in "Sub Query Preceding Keywords" or "Column Preceding Keywords" (e.g., the keywords in Tables 5 and 6). Also, if the previous token is "as" then there is a possibility of a with query occurrence. To illustrate, suppose the query was given by:

with base as (select quartername as qn from pv_insight_period) select qn from base In such a situation, the lexical analyzer 620 may determine the portion of the query "(select quartername as qn from pv_insight_period)" is a "with" query clause and the value (W) of the identifier assigned by the lexical analyzer 620 may be configured to reflect the position of the "with" query structure.

The final portion of the identifier structure (e.g., (0, 0, 0, 0, N)) assigned by the lexical analyzer 620 is used to identify the presence of nested functions within a query. For example, if the current token is a left parenthesis "(" and none of the above-described conditions is satisfied then the lexical analyzer 620 may identify or detect the presence of a nested function. To illustrate, suppose the query was given by:

select count(periodstart) from pv_insight_period

During analysis of the above query the portion (periodstart) may be identified as a nested function per the rules above, and the identifier may be configured with position information to indicate the position (N) of the nested function.

Using the above-described techniques, the lexical analyzer 620 may assign identifiers to the tokens of a query, where the identifiers impart various insights into the structure of the query and relationships between the query structures. After assigning identifiers to the tokens of the query, the lexical analyzer 620 may perform additional types of analysis to identify other types of information in the query that may facilitate analysis of queries and operations of the access control device 110, such as the functionality of the enforcer 123, as will be described in more detail below.

As an example, the lexical analyzer 620 provides functionality for identifying the table names and their position within queries. Similar to the above-described approach to assign the identifiers, the lexical analyzer 620 may utilize a rules-based approach to identify table names within queries. For example, suppose the query was given by:

select quartername, duein from pv_insight_period, pv_insight_drugallocation

Applying the above-described concepts, the lexical analyzer 620 may assign each token an identifier and identify the tables as shown below in Table 7:

TABLE 7

| Identifier | Token | Is Table? |
|---|---|---|
| (0, 0, 0, 0, 0) | select | FALSE |
| (0, 0, 0, 0, 0) | quartername | FALSE |
| (0, 0, 0, 0, 0) | , | FALSE |
| (0, 0, 0, 0, 0) | duein | FALSE |
| (0, 0, 0, 0, 0) | from | FALSE |
| (0, 0, 0, 0, 0) | pv_insight_period | TRUE |
| (0, 0, 0, 0, 0) | , | FALSE |
| (0, 0, 0, 0, 0) | pv_insight_drugallocation | TRUE |

As can be appreciated from the identifiers in Table 7 above, the exemplary query corresponding to Table 7 does not include any subqueries, "with" queries, column definitions, or nested queries, and therefore, the corresponding identifier values for each of these query elements are set to 0. Additionally, it can be seen from Table 7, that the lexical analyzer 620 identified two tokens within the query as tables, specifically, the tokens "pv_insight_period" and "pv_insight_drugallocation".

To identify the tables shown in Table 7 above, the lexical analyzer 620 may utilize a set of table identification rules, which may specify that a table is identified when current token is of the type "identifier" and the last keyword token is one of the following:

TABLE 8

FROM
JOIN
INNERJOIN
FULLJOIN
FULLOUTERJOIN
LEFTJOIN
RIGHTJOIN
LEFTOUTERJOIN
RIGHTOUTERJOIN
INTO
UPDATE
TABLE

It is noted that the exemplary rules shown above may be utilized for relational data, such as may be present in the relational database 153 of FIG. 1, but that other rules may be applied to identify table names in other database or data source types. For example, a query associated with the BigQuery database 154 may utilize a different form to designate tables, such as:

select molecule_chembl_id from prdt-nv-dev-us-resr-svc97.dm_research.dm_compound In the example above, "prdt-nv-dev-us-resr-svc97" may correspond to a project name, "dm_research" may correspond to a dataset_name, and "dm_compound" represents the table name. Thus, for queries pertaining to data of the form similar to the BigQuery data shown above, the lexical analyzer 620 may identify tables based on the "dot" structure above (e.g., project_name.dataset_name.table_name).

A further type of analysis that may be performed by the lexical analyzer 620 is identification of table aliases. Table aliases may be identified by the lexical analyzer 620 using rules similar to those described above. To illustrate, a table alias may be identified based on detection of a token of the type "identifier" and the last keyword is one shown in Table 9:

TABLE 9

FROM
JOIN
INNERJOIN
FULLJOIN
FULLOUTERJOIN
LEFTJOIN
RIGHTJOIN
LEFTOUTERJOIN
RIGHTOUTERJOIN
INTO
UPDATE
TABLE

It is noted that table alias names may follow different precedence formats with respect to the above-identified rules. For example, a first format may be referred to as an "AS" format of the form "table_name AS table_alias". To illustrate, in the query "select periodstart from pv_insight_period as period_table" the table name is identified as "pv_insight_period" as described above. Following the exemplary table alias identification rules above, "period_table" may be identified as the alias to the table "pv_insight_period". The analysis by the lexical analyzer for the exemplary query above is shown below in Table 10:

TABLE 10

| Identifier | Token | Is Table? | Is Alias? | Alias For Table Name |
|---|---|---|---|---|
| (0, 0, 0, 0, 0) | select | FALSE | FALSE | |
| (0, 0, 0, 0, 0) | period_table | TRUE | TRUE | |
| (0, 0, 0, 0, 0) | . | FALSE | FALSE | |
| (0, 0, 0, 0, 0) | quartername | FALSE | FALSE | |
| (0, 0, 0, 0, 0) | From | FALSE | FALSE | |
| (0, 0, 0, 0, 0) | pv_insight_period | TRUE | FALSE | |
| (0, 0, 0, 0, 0) | As | FALSE | FALSE | |
| (0, 0, 0, 0, 0) | period_table | FALSE | TRUE | pv_insight_period |

Another format for table aliases is shown in the following query:

select periodstart from pv_insight_period period_table where pv_insight_period is the identified table name and "period_table" is identified as an alias on the basis that "period_table" is an identifier and the last keyword identified is a table-type token (e.g., the table "pv_insight_period").

While the examples shown above illustrate functionality of the lexical analyzer 620 that may be used to assign identifiers to tokens of the query, identify tables and alias, and other features of queries, the lexical analyzer 620 also provides functionality for identifying other features within queries. For example, after identifying table names and their aliases, the lexical analyzer 620 may identify column names and their position within the query. Column identification may be achieved using a rules-based approach similar to the approaches described above. For example, the lexical analyzer 620 may identify columns based on detection, within a query, of an identifier and particular keywords, such as a last keyword being one of the keywords shown in Table 11 below.

TABLE 11

| |
|---|
| SELECT |
| WHERE |
| ORDERBY |
| ON |
| SET |
| GROUPBY |
| JSON_EXTRACT_ARRAY |
| UNNEST |
| ARRAY |
| ARRAY_AGG |
| ANY_VALUE |

As an illustrative example, suppose the query under consideration is:

select qn from (select quartername as qn from pv_insight_period) as base

Using the exemplary rules above, the lexical analyzer 620 may detect columns in the query above as shown below, where "qn" is identified as a column name.

TABLE 12

| Identifier | Token | Is Column? |
|---|---|---|
| (0, 0, 0, 0, 0) | select | FALSE |
| (0, 0, 0, 0, 0) | qn | TRUE |
| (0, 0, 0, 0, 0) | from | FALSE |
| (0, 1, 4, 0, 0) | ( | FALSE |
| (0, 1, 4, 0, 0) | select | FALSE |
| (0, 1, 4, 0, 0) | quartername | TRUE |
| (0, 1, 4, 0, 0) | as | FALSE |
| (0, 1, 4, 0, 0) | qn | FALSE |
| (0, 1, 4, 0, 0) | from | FALSE |
| (0, 1, 4, 0, 0) | pv_insight_period | FALSE |
| (0, 0, 0, 0, 0) | ) | FALSE |
| (0, 0, 0, 0, 0) | as | FALSE |
| (0, 0, 0, 0, 0) | base | FALSE |

While the exemplary query above provides an explicit query name, wildcards may also be used to identify columns with a query. For example, a query of the form "select * from pv_insight_period" includes * as a wildcard. Applying the column identification analysis of the lexical analyzer 620 to this query may result in:

TABLE 13

| Identifier | Token | Is Column? | Is WC? |
|---|---|---|---|
| (0, 0, 0, 0, 0) | select | FALSE | FALSE |
| (0, 0, 0, 0, 0) | * | TRUE | TRUE |
| (0, 0, 0, 0, 0) | from | FALSE | FALSE |
| (0, 0, 0, 0, 0) | pv_insight_period | FALSE | FALSE |

The wildcard example above involves a special case of column detection that follows the rule that a token type of wild-card is identified as a column name if the last keyword identified is "select".

As with table identification, which is followed by table alias identification, the lexical analyzer 620 may also identify column aliases for identified columns. For example, once the column names are identified, the lexical analyzer 620 may identify column aliases and the position of the column aliases. The column alias identification may apply a rule-based approach similar to the approaches described above. To illustrate, rules applied to identify column aliases may specify that the token type should be an identifier and the last keyword of the token is one of the keywords shown in Table 14.

TABLE 14

| |
|---|
| SELECT |
| WHERE |
| ORDERBY |
| ON |
| SET |
| GROUPBY |
| JSON_EXTRACT_ARRAY |
| UNNEST |
| ARRAY |
| ARRAY_AGG |
| ANY_VALUE |

For example, assuming the following query:

select quartername as qn from pv_insight_period the column alias identification performed by the lexical analyzer 620 will be of the form,

TABLE 15

| Col. Alias | Col. Indexes | Identifier | Token | Is Col? |
|---|---|---|---|---|
| | [ ] | (0, 0, 0, 0, 0) | select | FALSE |
| qn | [0, 1, 2, 3] | (0, 0, 0, 0, 0) | quartername | TRUE |
| | [ ] | (0, 0, 0, 0, 0) | as | FALSE |
| | [ ] | (0, 0, 0, 0, 0) | qn | FALSE |
| | [ ] | (0, 0, 0, 0, 0) | from | FALSE |
| | [ ] | (0, 0, 0, 0, 0) | pv_insight_perio d | FALSE |

As shown above, the lexical analyzer 620 may identify quartername as a column and qn as the column alias.

It is noted that a format of the column alias name precedence (e.g., the relationship between columns and column aliases within queries) can vary within queries. For example, in a first form the precedence may be "column_name AS column_alias" and in a second form the precedence may be "column_name column_alias". Thus, for the query select quartername as qn from pv_insight_period, and the query select quartername qn from pv_insight_period, quartername is the column name and qn is identified as the column alias.

Once the lexical analyzer has identified the various pieces of information from the query under consideration, such as the columns, the column aliases, the tables, and the table aliases, the lexical analyzer 620 map performing table-column mapping to associate the identified columns with one of the identified tables. To achieve mapping of columns and tables, the lexical analyzer may utilize the identifiers assigned to the various tokens in the manner described above. Exemplary aspects of the mapping process are described below.

The mapping may leverage the hierarchical nature of the identifiers of the query. For example, where a query includes one or more subquery levels, an inner query mapping process may be used to identify direct column-table relationships that exist in the inner most query. To illustrate, if the given query is:

select qn, ps from (select quartername qn, periodstart ps from pv_insight_period) as base as in the examples above, the identifiers applied by the lexical analyzer 620 may indicate the presence of an inner query, which is the portion of the query corresponding to the tokens "select quartername qn, periodstart ps from pv_insight_period" while the outer query may correspond to the remaining part of the query. Taking the various types of information identified by the lexical analyzer 620 into consideration, the understanding of the exemplary query above may be similar to that shown below:

TABLE 16

| CAN | CI | RC | RT | Temp ID | ID | Token | Is Col? | Is Table? |
|---|---|---|---|---|---|---|---|---|
|  | [ ] | [ ] | [ ] | (0, 0, 0, 0) | (0, 0, 0, 0, 0, 0) | select | FALSE | FALSE |
|  | [ ] | [ ] | [ ] | (0, 0, 0, 0) | (0, 0, 0, 0, 0, 0) | qn | TRUE | FALSE |
|  | [ ] | [ ] | [ ] | (0, 0, 0, 0) | (0, 0, 0, 0, 0, 0) | , | FALSE | FALSE |
|  | [ ] | [ ] | [ ] | (0, 0, 0, 0) | (0, 0, 0, 0, 0, 0) | ps | TRUE | FALSE |
|  | [ ] | [ ] | [ ] | (0, 0, 0, 0) | (0, 0, 0, 0, 0, 0) | from | FALSE | FALSE |
|  | [ ] | [ ] | [ ] | (0, 1, 0, 0) | (0, 1, 6, 0, 0) | ( | FALSE | FALSE |
|  | [ ] | [ ] | [ ] | (0, 1, 0, 0) | (0, 1, 6, 0, 0) | select | FALSE | FALSE |
| qn | [6, 7, 8] | ['quartername'] | ['pv_insight_period'] | (0, 1, 0, 0) | (0, 1, 6, 0, 0) | quartername | TRUE | FALSE |
|  | [ ] | [ ] | [ ] | (0, 1, 0, 0) | (0, 1, 6, 0, 0) | qn | FALSE | FALSE |
|  | [ ] | [ ] | [ ] | (0, 1, 0, 0) | (0, 1, 6, 0, 0) | , | FALSE | FALSE |
| ps | [10, 11] | ['periodstart'] | ['pv_insight_period'] | (0, 1, 0, 0) | (0, 1, 6, 0, 0) | periodstart | TRUE | FALSE |
|  | [ ] | [ ] | [ ] | (0, 1, 0, 0) | (0, 1, 6, 0, 0) | ps | FALSE | FALSE |
|  | [ ] | [ ] | [ ] | (0, 1, 0, 0) | (0, 1, 6, 0, 0) | from | FALSE | FALSE |
|  | [ ] | [ ] | [ ] | (0, 1, 0, 0) | (0, 1, 6, 0, 0) | pv_insight_period | FALSE | TRUE |
|  | [ ] | [ ] | [ ] | (0, 0, 0, 0) | (0, 0, 0, 0, 0, 0) | ) | FALSE | FALSE |
|  | [ ] | [ ] | [ ] | (0, 0, 0, 0) | (0, 0, 0, 0, 0, 0) | as | FALSE | FALSE |
|  | [ ] | [ ] | [ ] | (0, 0, 0, 0) | (0, 0, 0, 0, 0, 0) | base | FALSE | FALSE |

Using the identifiers applied by the lexical analyzer 620, the column aliases (CAN), column indices (CI), related columns (RC), related tables (RT), columns (Is Col?), and tables (Is Table?) within the inner query may be identified, as shown above in Table 16. Thus, the lexical analyzer 620 may identify that quartername is a column (e.g., Is Col?=TRUE) and has a column alias name "qn" with column indices 6, 7, 8 (CI), and that "pv_insight_period" is a related table. Similar observations and relationships may be identified for the token "periodstart".

It is noted that some of the exemplary queries described above involved wildcards (e.g., *). Where a query involves a wildcard, which may not specify related columns, tables, etc. as in the example above, the associated columns or other relationship information may be obtained by the lexical analyzer based on a schema of related tables accessible to the lexical analyzer 620. It is noted that there may be multiple inner queries in some situations and the inner query mapping may be performed with respect to each inner query to identify the column and table names and aliases as described above.

Once inner query mapping is completed, the lexical analyzer 620 may perform inner-outer query mapping, in which the mapping is extended to any unmapped columns and/or tables in the outer query in view of the properties and relationships identified during inner query mapping. A temporary identification technique may be used to extend the relationships between the inner and outer query, shown as Temp ID in Table 16 above. For example, mapping of the inner query for "select qn, ps from (select quartername qn, periodstart ps from pv_insight_period) as base", as in Table 16 above, enables the mapping of the in inner query to be used to map the columns in the outer query, as shown in Table 17 below.

TABLE 17

| CAN | CI | RC | RT | Temp ID | Identifier | Token | Is Col? | Is Table? |
|---|---|---|---|---|---|---|---|---|
| | [ ] | [ ] | [ ] | (0, 0, 0, 0) | (0, 0, 0, 0) | select | FALSE | FALSE |
| | [ ] | [['quartername']] | [['pv_insight_period']] | (0, 0, 0, 0) | (0, 0, 0, 0) | qn | TRUE | FALSE |
| | [ ] | [ ] | [ ] | (0, 0, 0, 0) | (0, 0, 0, 0) | , | FALSE | FALSE |
| | [ ] | [['periodstart']] | ['pv_insight_period']] | (0, 0, 0, 0) | (0, 0, 0, 0) | ps | TRUE | FALSE |
| | [ ] | [ ] | [ ] | (0, 0, 0, 0) | (0, 0, 0, 0) | from | FALSE | FALSE |
| | [ ] | [ ] | [ ] | (0, 1, 0, 0) | (0, 1, 6, 0, 0) | ( | FALSE | FALSE |
| | [ ] | [ ] | [ ] | (0, 1, 0, 0) | (0, 1, 6, 0, 0) | select | FALSE | FALSE |
| qn | [6, 7, 8] | ['quartername'] | ['pv_insight_period'] | (0, 1, 0, 0) | (0, 1, 6, 0, 0) | quartername | TRUE | FALSE |
| | [ ] | [ ] | [ ] | (0, 1, 0, 0) | (0, 1, 6, 0, 0) | qn | FALSE | FALSE |
| | [ ] | [ ] | [ ] | (0, 1, 0, 0) | (0, 1, 6, 0, 0) | , | FALSE | FALSE |
| ps | [10, 11] | ['periodstart'] | ['pv_insight_period'] | (0, 1, 0, 0) | (0, 1, 6, 0, 0) | periodstart | TRUE | FALSE |
| | [ ] | [ ] | [ ] | (0, 1, 0, 0) | (0, 1, 6, 0, 0) | ps | FALSE | FALSE |
| | [ ] | [ ] | [ ] | (0, 1, 0, 0) | (0, 1, 6, 0, 0) | from | FALSE | FALSE |
| | [ ] | [ ] | [ ] | (0, 1, 0, 0) | (0, 1, 6, 0, 0) | pv_insight_period | FALSE | TRUE |
| | [ ] | [ ] | [ ] | (0, 0, 0, 0) | (0, 0, 0, 0) | ) | FALSE | FALSE |
| | [ ] | [ ] | [ ] | (0, 0, 0, 0) | (0, 0, 0, 0) | as | FALSE | FALSE |
| | [ ] | [ ] | [ ] | (0, 0, 0, 0) | (0, 0, 0, 0) | base | FALSE | FALSE |

As shown above in Table 17 as compared to Table 16, the column alias names (CAN) identified in the inner query can be used to map the corresponding related columns (RC) and related tables (RT). Similarly, where a column name is identified in the outer query as a wildcard, the associated columns may be mapped by pulling out the properties of the columns identified in the inner query (e.g., based on the schema as described above).

Similarly, mapping may also be performed for "with" query elements in queries, which have cross-references to properties in the query. For example, in the query:

with base as (select quartername as qn from pv_insight_period) select qn from base the portion "base" may be a "with" clause property for which mapping may be provided and the portion "(select quartername as qn from pv_insight_period)" corresponds to the "with" clause. Similar to the inner query-outer query mapping technique described above, the property of the with clause query may be utilized in the "select" query which follows. Like performing inner query mapping, the lexical analyzer 620 may initially perform mapping of the "with" clause, as shown in Table 18 below.

TABLE 18

| CAN | CID | RC | RT | Temp ID | Identifier | Token | Is Col? | Is Table? |
|---|---|---|---|---|---|---|---|---|
| | [ ] | [ ] | [ ] | (0, 0, 0, 0) | (0, 0, 0, 0) | with | FALSE | FALSE |
| | [ ] | [ ] | [ ] | (0, 0, 0, 0) | (0, 0, 0, 0) | base | FALSE | FALSE |
| | [ ] | [ ] | [ ] | (0, 0, 0, 0) | (0, 0, 0, 0) | as | FALSE | FALSE |
| | [ ] | [ ] | [ ] | (3, 0, 0, 0) | (3, 0, 0, 0) | ( | FALSE | FALSE |
| | [ ] | [ ] | [ ] | (3, 0, 0, 0) | (3, 0, 0, 0) | select | FALSE | FALSE |
| qn | [4, 5, 6, 7] | ['quartername'] | ['pv_insight_period'] | (3, 0, 0, 0) | (3, 0, 0, 0) | quartername | TRUE | FALSE |
| | [ ] | [ ] | [ ] | (3, 0, 0, 0) | (3, 0, 0, 0) | As | FALSE | FALSE |
| | [ ] | [ ] | [ ] | (3, 0, 0, 0) | (3, 0, 0, 0) | Qn | FALSE | FALSE |
| | [ ] | [ ] | [ ] | (3, 0, 0, 0) | (3, 0, 0, 0) | From | FALSE | FALSE |
| | [ ] | [ ] | [ ] | (3, 0, 0, 0) | (3, 0, 0, 0) | pv_insight_period | FALSE | TRUE |
| | [ ] | [ ] | [ ] | (0, 0, 0, 0) | (0, 0, 0, 0) | ) | FALSE | FALSE |
| | [ ] | [ ] | [ ] | (0, 0, 0, 0) | (0, 0, 0, 0) | Select | FALSE | FALSE |
| | [ ] | [ ] | [ ] | (0, 0, 0, 0) | (0, 0, 0, 0) | qn | TRUE | FALSE |
| | [ ] | [ ] | [ ] | (0, 0, 0, 0) | (0, 0, 0, 0) | from | FALSE | FALSE |
| | [ ] | [ ] | [ ] | (0, 0, 0, 0) | (0, 0, 0, 0) | base | FALSE | TRUE |

As in the inner-outer query mapping above, once the "with" clause property of the query is mapped, such as the apply the mapping for CAN, OD, RC, RT to the similar fields for the token "qn", as shown below.

TABLE 19

| CAN | CID | RC | RT | Temp ID | Identifier | Token | Is Col.? | Is Table? |
|---|---|---|---|---|---|---|---|---|
| | [ ] | [ ] | [ ] | (0, 0, 0, 0) | (0, 0, 0, 0, 0) | with | FALSE | FALSE |
| | [ ] | [ ] | [ ] | (0, 0, 0, 0) | (0, 0, 0, 0, 0) | base | FALSE | FALSE |
| | [ ] | [ ] | [ ] | (0, 0, 0, 0) | (0, 0, 0, 0, 0) | as | FALSE | FALSE |
| | [ ] | [ ] | [ ] | (3, 0, 0, 0) | (3, 0, 0, 0, 0) | ( | FALSE | FALSE |
| | [ ] | [ ] | [ ] | (3, 0, 0, 0) | (3, 0, 0, 0, 0) | select | FALSE | FALSE |
| qn | [4, 5, 6, 7] | ['quartername'] | ['pv_insight_period'] | (3, 0, 0, 0) | (3, 0, 0, 0, 0) | quartername | TRUE | FALSE |
| | [ ] | [ ] | [ ] | (3, 0, 0, 0) | (3, 0, 0, 0, 0) | As | FALSE | FALSE |
| | [ ] | [ ] | [ ] | (3, 0, 0, 0) | (3, 0, 0, 0, 0) | Qn | FALSE | FALSE |
| | [ ] | [ ] | [ ] | (3, 0, 0, 0) | (3, 0, 0, 0, 0) | From | FALSE | FALSE |
| | [ ] | [ ] | [ ] | (3, 0, 0, 0) | (3, 0, 0, 0, 0) | pv_insight_period | FALSE | TRUE |
| | [ ] | [ ] | [ ] | (0, 0, 0, 0) | (0, 0, 0, 0, 0) | ) | FALSE | FALSE |
| | [ ] | [ ] | [ ] | (0, 0, 0, 0) | (0, 0, 0, 0, 0) | select | FALSE | FALSE |
| | [ ] | ['quartername'] | ['pv_insight_period'] | (0, 0, 0, 0) | (0, 0, 0, 0, 0) | qn | TRUE | FALSE |
| | [ ] | [ ] | [ ] | (0, 0, 0, 0) | (0, 0, 0, 0, 0) | from | FALSE | FALSE |
| | [ ] | [ ] | [ ] | (0, 0, 0, 0) | (0, 0, 0, 0, 0) | base | FALSE | TRUE |

As shown above, the lexical analysis performed by the lexical analyzer 620 enables identification of various components of a query, such as tables, columns, subqueries, and other information and query elements, as well as relationships between these components, including as between inner and outer queries and "with" clauses, and the like. It should be noted that while specific techniques and types of query analysis, identification, and mapping have been described above, such description is provided by way of limitation, rather than by way of limitation and that other techniques may be used in accordance with the present disclosure.

The information derived from the lexical analysis may be provided to the enforcer 604 where it may be used to enforce any restrictions on granted access requests in accordance with policy resolution outcomes, as described above. For example, the column names, table names, and the associativity between them are identified, once identified, may be used in connection with the policy or policy provisions (e.g., restriction data) provided to the enforcer 604 (e.g., as part of the enforcement request 536 received from the data API 530 of FIG. 5) to regulate access to resources in accordance with relevant policy provisions. In the description below, exemplary functionality for enforcing restrictions and policy control provisions are described with respect to enforcer 604. However, it should be understood that the exemplary techniques for rewriting queries below may also be performed by the query generator 630 of FIG. 6, which may be a standalone component or functionality of a system in accordance with the present disclosure or may be a function of the enforcer 604. For example and as briefly described above, possible actions that may implemented to enforce requirements of relevant policies may include restricting by row, restrict by column, masking rows, masking columns, and masking cells, as non-limiting examples.

To illustrate, exemplary actions for restricting access in accordance with the concepts described herein, the table "pv_insight_period" referenced in some of the exemplary queries above is considered in the form shown below:

TABLE

"pv_insight_period"

| quarterid | quartername | periodstart | periodend |
|---|---|---|---|
| 1 | Q1 | 1 | 3 |
| 2 | Q2 | 4 | 6 |
| 3 | Q3 | 7 | 9 |
| 4 | Q4 | 10 | 12 |

The restrict access by row action may be applied by the enforcer 604 to remove entire rows from being displayed to the user, where the rows that are removed may be based on a provided condition (e.g., a condition presented in a policy resolution matrix of the relevant policy). Parameters that may be used to restrict access by row are shown in the table below and include column name, column value, dataset name, table name. The column name parameter may specify the column of the row used to condition or restrict access within a row, and the column value parameter may specify the value of the column for which access to the row should be restricted. For queries involving the BigQuery database 154, the dataset_name parameter may be used to identify the dataset to be considered, and the table name parameter may specify the name of the table to be considered.

Taking the above into account, given a query:
   select quartername, a3.name1 from (select quartername, periodstart as name1 from (select quartername, periodstart from pv_insight_period) as a2) as a3
and a scenario where the parameters parsed from the policy are specified as: column name: "periodstart"; column value: "1"; and table name: "pv_insight_period", the enforcer 604 may rewrite the query above to enforce the parameters of the policy as:
   select quartername, a3.name1 from (select quartername, periodstart as name1 from (select quartername, periodstart from pv_insight_period where pv_insight_period.periodstart!='1') as a2) as a3

As a result of the query modifications applied by the enforcer 604 (e.g., where pv_insight_period.periodstart!='1'), the row of the table "pv_insight_period" have the value of "1" in the column "periodstart" may be omitted or restricted and the query may return the table to the user as shown below:

TABLE

"pv_insight_period" (restricted by row)

| quarterid | quartername | periodstart | Periodend |
|---|---|---|---|
| 2 | Q2 | 4 | 6 |
| 3 | Q3 | 7 | 9 |
| 4 | Q4 | 10 | 12 |

In an aspect, the enforcer 604 may apply restriction actions on the inner-most query possible. In the example above, the restriction was enforced with the use of a "WHERE" clause. Situations where the enforcer 604 enforces restrictions by inserting "WHERE" into the query may include: a "WHERE" query is already present, such as:

select quartername, periodstart from pv_insight_period where quartername='Q1'

In such cases the new condition (e.g., periodstart !=1) has to be appended using the "AND" keyword:

select quartername, periodstart from pv_insight_period where periodstart !=1 and quartername='Q1'

In instances for which a "WHERE" query is not present in the given query:

select quartername, periodstart from pv_insight_period the new condition (e.g., periodstart !=1) may be inserted along with the "WHERE" keyword, select quartername, periodstart from pv_insight_period where periodstart !=1

Another form of restriction that may be applied by the enforcer is to restrict by column. This will remove an entire column from the results returned to the user, and may be based on a set of conditions. Exemplary conditions may include column name, dataset_name, and table name. Column name may specify the name of the column to be restricted, the dataset_name may be used to specify the dataset of the BigQuery database 154 to which the condition applied, and the table name may specify the name of the table to which the condition applies.

For example and considering the table "pv_insight_period" above, a query may be expressed as:

select quartername, name1, periodstart from (select quartername, periodstart, periodend as name1 from pv_insight_period) as base and the parameters from the relevant the policy may be provided or specified as: column name: "periodstart", "periodend" and table name: "pv_insight_period". Taking these conditions into account, the enforcer 604 may rewrite the query to the following:

select quartername from (select quartername from pv_insight_period) as base and the results returned to the user (e.g., as the restricted data 536) may be of the form:

TABLE

"pv_insight_period" (restricted by column)

| quarterid | quartername |
|---|---|
| 1 | Q1 |
| 2 | Q2 |
| 3 | Q3 |
| 4 | Q4 |

As shown above, the restrict by column conditions applied by the enforcer may be used to restrict display of values from the table by column (e.g., the columns specified in the conditions, such as "periodstart" and "periodend"). In restricting access by column, the enforcer 604 may remove the columns from query starting from the innermost and moving to the outermost query.

Another exemplary restriction that may be applied to restrict access to data in one or more data sources is the mask by row action, which may be used to mask an entire row with a "mask_column_value" based on the condition(s) provided (e.g., the "mask_column_value" may be displayed to the user for the row subjected to the mask by row restriction). Exemplary parameters that may be used to facilitate restrictions using mask by row include column name (e.g., the name of the column subject to the restriction), the column value (e.g., the value of the column upon which the masking is applied), mask column value (e.g., the replacement value for any rows subjected to the mask by row restriction), the dataset_name (e.g., the name of the dataset within the BigQuery database 154 subjected to the restrict by row), and table name (e.g., the name of the table subjected to the restrict by row).

As an illustrative example, suppose the query under consideration by the enforcer 604 is:

select quartername, periodstart, periodend as name1 from pv_insight_period and the parameters of the relevant policy are column name: "periodstart", column value: "4", table name: "pv_insight_period", mask_column_value: "RESTRICTED". Similar to the techniques described above, the enforcer 604 may rewrite the query based on the policy parameters to obtain a query of the form:

select CASE WHEN pv_insight_period.periodstart=4 THEN 'RESTRICTED' ELSE quartername END as quartername, CASE WHEN pv_insight_period.periodstart=4 THEN
    'RESTRICTED' ELSE periodstart::varchar END as periodstart, CASE WHEN pv_insight_period.periodstart=4 THEN 'RESTRICTED' ELSE periodend::varchar END as name1 from pv_insight_period As a result of the restrictions imposed by the modified or rewritten query, the information returned to the user may be as follows:

TABLE

"pv_insight_period" (Mask by Col. Value)

| quarterid | quartername | periodstart | periodend |
|---|---|---|---|
| 1 | Q1 | 1 | 3 |
| 2 | RESTRICTED | RESTRICTED | RESTRICTED |
| 3 | Q3 | 7 | 9 |
| 4 | Q4 | 10 | 12 |

For masking rows, the enforcer 604 may apply the modifications to the query to the outermost "SELECT" query possible. In an aspect, "CASE" statements may be used to enforce masking of rows on the given query, where the syntax for the "CASE" statement is of the form:

CASE WHEN<<column name>>=<<column value>>THEN<<mask_column_value>>ELSE
    inplace_column END as inplace_column where dynamic values inside<< >> are replaced by the parameters provided from mask by row parameters. A type cast of columns may be used when there is ambiguity between the type of a column and the type of the "column_value"/"mask_column_value" provided in the condition or restriction parameters.

In an aspect, parameters may be provided as a string type by default, but the type may be modified in accordance with the column data type. As a non-limiting example, the request parameters considered may include column_name: "periodstart", column_value: "4", table name: "pv_insight_period", mask_column_value: "RESTRICTED", where the schema of the table "pv_insight_period" is given by:

| | Column Name | Data Type | Name |
|---|---|---|---|
| 1 | Quartered | integer | integer |
| 2 | Quartername | character varying | character varying |

| | Column Name | Data Type | Name |
|---|---|---|---|
| 3 | periodstart | integer | integer |
| 4 | periodend | integer | integer |

From the exemplary schema shown above it is evident that "column_name": "periodstart" is an integer. Thus, when referring the "column_name" and "column_value" pair, the string given has to be represented as an integer in accordance with the "CASE" statement schema, such as:

select CASE WHEN pv_insight_period.periodstart=4 THEN 'RESTRICTED' ELSE quartername END as quartername, CASE WHEN pv_insight_period.periodstart=4 THEN
'RESTRICTED' ELSE periodstart::varchar END as periodstart, CASE WHEN pv_insight_period.periodstart=4 THEN 'RESTRICTED' ELSE periodend::varchar END as name1 from pv_insight_period Additionally, the "mask_column_value" derived from the policy is of String type ("RESTRICTED"). As such, when referring to the "inplace_column", type casting may be provided for integer type columns in accordance with the "CASE" statement schema, such as by:

select CASE WHEN pv_insight_period.periodstart=4 THEN 'RESTRICTED' ELSE quartername END as quartername, CASE WHEN pv_insight_period.periodstart=4 THEN
'RESTRICTED' ELSE periodstart::varchar END as periodstart, CASE WHEN pv_insight_period.periodstart=4 THEN 'RESTRICTED' ELSE periodend::varchar END as name1 from pv_insight_period Another restriction that may be applied when rewriting queries is a mask column action, which allows access to a data source to be restricted by masking the entire column, such as with a "mask_column_value" that masks data when displayed to the user. Parameters that may be utilized for masking data by row may include column name (e.g., the name of the column to be masked), mask_column_value (e.g., the value used to mask column values in the applicable columns per the column name parameter), table name (e.g., the name of the table for which the mask by column restriction is to be applied), and dataset_name (e.g., a parameter identifying a dataset of the BigQuery database 154 to which the mask by column restriction is to be applied).

To illustrate, suppose the query is given by:
select quartername, periodstart, periodend as name1 from pv_insight_period
and the parameters from the relevant policy are: column name: "periodstart", table name: "pv_insight_period", mask_column_value: "RESTRICTED". Given the above inputs, the enforcer 604 may rewrite the as:
select quartername, CASE periodstart WHEN periodstart THEN 'RESTRICTED' END as periodstart, periodend as name1 from pv_insight_period
and the table results returned to the user are modified to:

TABLE

"pv_insight_period" (mask by column)

| quarterid | quartername | periodstart | periodend |
|---|---|---|---|
| 1 | Q1 | RESTRICTED | 3 |
| 2 | Q2 | RESTRICTED | 6 |

TABLE-continued

"pv_insight_period" (mask by column)

| quarterid | quartername | periodstart | periodend |
|---|---|---|---|
| 3 | Q3 | RESTRICTED | 9 |
| 4 | Q4 | RESTRICTED | 12 |

As can be appreciated from the example above, the mask by column action enables the enforcer 604 to mask values of one or more columns within the results returned by the query. In an aspect, the mask by column action may be applied on the outermost "SELECT" query possible. Additionally, "CASE" statements may be used for enforcing mask by column actions on a given query. The syntax for the "CASE" statement may take the form, CASE inplace_column WHEN inplace_column THEN<<mask_column_value>>END as inplace_column where dynamic values inside<< >> are replaced by the parameters provided from the relevant policy parameters provided to the enforcer 604.

Similar to the examples above, the enforcer 604 may also apply restrictions to particular cells (e.g., values within a specific row/column pair) using a mask cell restriction. The mask cell action allows the enforcer 604 to mask a single cell with a "mask_column_value" when displayed to the user, which may be based on conditions provided in the applicable policy. Parameters that may be used by the enforcer 604 to rewrite queries in a manner that enforces the mask cell restriction may include: column name (e.g., the name of the column to be masked), column value (e.g., the value of the column based on which an adjacent column cell is masked), mask column value (e.g., the value used to mask column values in the applicable columns per the column name parameter), adjustment column name (e.g., the adjacent column in which the cell is to be masked), table name (e.g., the name of the table for which the mask by column restriction is to be applied), and dataset name (e.g., a parameter identifying a dataset of the BigQuery database 154 to which the mask by column restriction is to be applied).

As an illustrative example, suppose the query under consideration by the enforcer 604 is:
select quartername, periodstart, periodend as name1 from pv_insight_period
and the parameters of the policy to be enforced include: column name: "periodstart", column_value: "4", table name: "pv_insight_period", mask_column_value: "RESTRICTED", and adjustment column name: "periodend". Under such conditions, the rewritten query may be of the form:
select quartername, periodstart, CASE WHEN periodstart=4 THEN 'RESTRICTED' ELSE periodend::varchar END as name1 from pv_insight_period
and the results returned to the user as a result of the modified query may be:

TABLE

"pv_insight_period"

| quarterid | quartername | periodstart | periodend |
|---|---|---|---|
| 1 | Q1 | 1 | 3 |
| 2 | Q2 | 4 | RESTRICTED |

TABLE-continued

| | "pv_insight_period" | | |
|---|---|---|---|
| quarterid | quartername | periodstart | periodend |
| 3 | Q3 | 7 | 9 |
| 4 | Q4 | 10 | 12 |

When applying the mask cell restriction, the enforcer 604 may apply the mask on the outermost "SELECT" query possible. As in the examples above, this will ensure that the mask is properly applied as opposed to applying on the innermost "SELECT" query, which may result in the mask being applied in an incomplete manner and allowing the value for which the mask was intended to be returned to the user. It is noted that "CASE" statements may be used to enforce mask cell restrictions on a given query. The syntax for the "CASE" statement can take the form of:

CASE WHEN<<column name>>=<<column_value>>THEN<<mask_column_value>>ELSE inplace_column END as inplace_column where dynamic values inside<< >> are replaced by the parameters provided from the parameters of the relevant policy. It is noted that a type cast of columns may also be used to enforce masking of cells, such as when there is ambiguity between the type of a column and the type of the "column_value"/"mask_column_value" provided in the mask by cell parameters. In an aspect, request parameters may be provided as a string type by default, but may be modified in accordance with the column data type.

As a non-limiting and illustrative example, suppose the parameters from the relevant policy include: column_name: "periodstart"; column_value: "4"; table name: "pv_insight_period"; mask_column_value: "RESTRICTED"; and adjustment column name: "periodend". Assuming the schema of the table "pv_insight_period" is the same as described above, "column_name": "periodstart" may be of the integer type. Accordingly, the "CASE" statement schema when referring the strings for "column_name" and "column_value" may be represented as an integer, such as:

select quartername, periodstart, CASE WHEN periodstart=4 THEN 'RESTRICTED' ELSE periodend::varchar END as name1 from pv_insight_period"

If the "mask_column_value" is provided as a string type ("RESTRICTED"), the "CASE" statement schema may be used when referring to the "inplace_column" to type cast it to an integer type:

select quartername, periodstart, CASE WHEN periodstart=4 THEN 'RESTRICTED' ELSE periodend::varchar END as name1 from pv_insight_period As shown above, the functionality provided by the tokenizer 610, the lexical analyzer 620, and the enforcer 604 enables queries received in access requests to be tokenized, contextually analyzed, and rewritten in a manner that enables appropriately configured restrictions on access to data sources to be enforced according to access policies configured in accordance with the concepts described herein. It can be appreciated from the foregoing that the ability to rewrite queries to comply with applicable restrictions enables the data returned to the user (e.g., as the restricted data 536 of FIG. 5) to be controlled in a policy compliant manner. However, systems operating in accordance with the present disclosure provide further mechanisms to enforce restrictions and other access control mechanisms and to verify that access to resources is provided in compliance with relevant access control policies.

To illustrate, once the given query is rewritten by the enforcer 604 (or the query generator 630), a syntax structure of the rewritten query may be verified using a query validator 640. To validate queries, the query validator 640 may include parsing logic. The parsing logic may leverage different types of parsing depending on the type of query involved, such as a query of the relational database 153 of FIG. 1 or a query of the BigQuery database 154 of FIG. 1. For example, a SLR parser may be used to validate queries of the relational database 153 while a LL parser may be used to validate queries of the BigQuery database 154. Exemplary details of these two parsers are described below.

The different parsers of the query validator 640 may be configured to operate using a context fee grammar. A formal grammar is essentially a set of production rules that describe all possible strings in a given formal language. In contrast, a context-free grammar has four components: (1) A set of non-terminals (V) (e.g., syntactic variables that denote sets of strings that help define the language generated by the grammar); (2) a set of tokens, known as terminal symbols (/), which are the basic symbols from which strings are formed; (3) a set of productions (P) that specify the manner in which the terminals and non-terminals can be combined to form strings, where each production consists of a non-terminal called the left side of the production, an arrow, and a sequence of tokens and/or non-terminals, called the right side of the production; and (4) a start symbol (S), which may be one of the non-terminals used to designate where the production begins.

As an example, assume a simple query of the form:
select distinct col_iden from table To create a grammar for this query a start symbol "S" is defined, where S is a non-terminal that derives non-terminal value S'. This may be expressed as a rule: S→S'. The first entry in the input is a "select", so the non-terminal "S'" will derive the non-terminal value "SELECT", resulting in a rule: S'→SELECT. Non-terminal value "SELECT" derives the terminal value "select" and will also have a non-terminal value, so as to validate the next input value from the query which is "DISTINCT". As a rule, this may be expressed as: SELECT→select DISTINCT. Similarly other grammar rules may be defined, such as a rule: DISTINCT→distinct COL_IDEN, a rule: COL_IDEN→col_iden FROM, a rule: FROM→ from TABLE_IDEN, a Rule: TABLE_IDEN→table_iden. Thus, the resulting grammar may be given by:

S→S'
S'→SELECT
SELECT→select DISTINCT
DISTINCT→distinct COL_IDEN
COL_IDEN→col_iden FROM
FROM→from TABLE_IDEN
TABLE_IDEN→table_iden The above set of rules may then be used to validate the syntax of the given input.

To derive the above-described grammar in a context free manner a first and follow approach may be used. The first set may be computed according to the following rules:

If x is a terminal, then FIRST(x)={'x'}
If x→$\epsilon$, is a production rule, then add C to FIRST(x).
If X→Y1 Y2 Y3 . . . Yn is a production,
FIRST(X)=FIRST(Y1)
If FIRST(Y1) contains $\epsilon$ then FIRST(X)={FIRST(Y1)-$\epsilon$}∩{FIRST(Y2)}
If FIRST (Yi) contains $\epsilon$ for all i=1 to n, then add C to FIRST(X).

Once the first set is computed, the follow set may be obtained. The follow set gives the set of terminals that can follow X in a string derived in the grammar. Exemplary rules for computing the follow set include:

FOLLOW(S) = { $ } // where S is the starting Non-Terminal
If A -> pBq is a production, where p, B and q are any grammar symbols, then everything in FIRST(q) except € is in FOLLOW(B).
If A->pB is a production, then everything in FOLLOW(A) is in FOLLOW(B).
If A->pBq is a production and FIRST(q) contains €, then FOLLOW(B) contains { FIRST(q) - €} U FOLLOW(A)

Having briefly described concepts for deriving a grammar in a context free manner, further details regarding the SLR parser of the query validator 640 will now be described. The SLR parser, or simple LR parser, is a type of LR (left-to-right) parser with small parse tables and a relatively simple parser generator algorithm that uses a shift-reduce action and bottom-up approach that reduces the input from the bottom to head of a parse tree, by scanning the input from left to right. As used herein, an SLR(1) parser stands for, (S) Simple, (L) Left-to-right scan, (R) Rightmost derivation in reverse, (1) number of input symbol of look-ahead. The general idea of a bottom-up parser is to construct a derivation in reverse, and may use the following steps:

Shift some symbols of input until a reduction is found to be applied.

At the reach of a reduction step, if a specific substring is matched, then the body of a production is replaced by the non-terminal at the head of the production.

The key rules in the bottom up parsers are when to shift and reduce the given input, to arrive at the root of the derivation.

The SLR(1) parser of the query validator 640 may utilize the exemplary steps below to validate a rewritten query, each of which are described in more detail below:

Grammar Parsing and Augumented Grammar Inclusion;
Item Set Construction;
First-Follow Set Construction;
LR Parsing Table Construction; and
Input Parsing and Decision making.

The above steps may identify terminals, non-terminals, productions, or other grammars with the input query in a rules-driven manner. For example, each of the above steps except "Input Parsing and Decision Making" are performed a single time, resulting in improved performance through rapid validation of the query. To illustrate, consider the following grammar rules from above, E→T+F
T→id1  F→id2

The augmented grammar may indicate to the parser when to stop parsing and announce acceptance of the input. Based on the grammar taken into consideration prior to stopping the parsing, the augmented grammar may be used to define a new start symbol E' and a new production E'→E. The grammar rules derived by the parser may take the form:

E'→E
E→T+F
T→id1  F→id2

As described above, a set of terminals may be determined, such as {'+', 'id1', 'id2'} and a set of non-terminals. From the grammar taken into consideration, the non-terminals determined to be present are:

{'E', "E", 'F', 'T'}

Symbols, which may be a combination of terminals and non-terminals may also be identified, which in this example may include {'+', 'E', "E", 'F', 'T', 'id1', 'id2'}. A start symbol is the first non-terminal symbol defined in a grammar production rules (e.g., the augumented grammar). In the example above, the start symbol may be E'.

During item set construction, an item of the grammar is the production of a grammar with a Dot(.) at some position of the right hand side, which eventually defines the current state and next state when parsing through the input. The Dot(•) may be used to keep track as the input will be analyzed from left to right. To illustrate, consider an item set T.+F, where the dot (.) means T has already been processed and +F is a potential suffix. The items can be divided into kernel items and non-kernel items, where kernel items are the ones which have a "•" as the first symbol in the RHS of the productions. All other items are referred to as non-kernel items.

The algorithm for construction of LR(0) items is based on two functions, Closure( ) and goto( ). The Closure (I) is defined as the Closure of item I, and is constructed as the set of items from the current item I based on two rules:

1.) Initially every item in I is added to closure(I)
2.) If E→T+.F is in closure (I), and F→id2 is a production, then add the item F→.id2 to I if it is not already there. Keep adding productions till no more new items could be added to I.

The next step of the items construction is the goto( ) function. This function is defined as goto(I, X) where I (E→T.+F) is the current item being considered and X("+") is the grammar symbol. Goto(I, +) is defined using the following rule.

Goto(I, +) results in new item set I1→E→T+.F

Then, for the shifted item, closure is computed using the procedure discussed above. For example, the item set for grammar 0. E'→E may be constructed as follows:

E→T+F
T→id1
F→id2

From the concepts discussed above, the item E'→.E needs to be added by finding the closure of this to add it to the first item set. The complete set of items is given in Table 20, below:

TABLE 20

| Item | Set of Items | GoTo | Comments |
|---|---|---|---|
| I0 | E' -> .E | This is the first item, so no GoTo | Add the initial item and compute closure |
|  | E -> .T + F |  | There is a non-terminal E after the dot in the RHS, so add the productions of the non-terminal E |

TABLE 20-continued

| Item | Set of Items | GoTo | Comments |
|------|--------------|------|----------|
|      | T -> .id1    |      | There is a non-terminal T after the dot (.) in the RHS, so add the productions of the non-terminal E. There is no non-Terminal after dot. Therefore that complete this item set. |
| I1   | E' -> E.     | (I0, E) = I1 | From I0, consider E appearing after the dot (.); shift the dot by one position and compute the closure of the resultant. The dot (.) comes as the last symbol, thus no more items could be added to I1. |
| I2   | E -> T. + F  | (I0, T) = I2 | One production from I0 has a T after the dot (.); shift the dot (.) by one position to get the new item. There is no non-terminal after dot (.); therefore that complete this item set. |
| I3   | T -> id1.    | (I0, id1) = I3 | There is no non-Terminal after dot. Therefore that complete this item set. |
| I4   | E -> T + .F  | (I2, +) = I4 | One production from I2 has a + after the dot (.); shift the dot by one position to get the new item. |
|      | F -> .id2    |      | There is a non-terminal F after the dot (.) in the RHS; add the productions of the non-terminal F |
| I5   | E -> T + F.  | (I4, F) = I5 | There is no non-terminal after dot (.); therefore that completes this item set. |

To summarize, it can be observed in Table 20 that the non-terminal/terminal appearing in the RHS after the dot (.) and GoTo can be computed by writing the item with the dot (.) shifted by one position to the right. After shifting, closure can be computed for the shifted item, and this results in adding the items if the new symbol that is appearing after the dot is a non-terminal.

As explained above, a first-follow set construction may be utilized. The following rules may be used to construct the first-follow table:

The First of a Terminal is always the Terminal itself (e.g., id1, id2, +)

Letting the follow symbol be $, yields a set of non-terminals as shown below in Table 21:

TABLE 21

| Non-Terminal | First | Comment for First | Follow | Comment for Follow |
|--------------|-------|-------------------|--------|--------------------|
| E'           | {id1} | FIRST(E)          | {$}    | Follow of Start Symbol is always $ |
| E            | {id1} | First(T)          | {$}    | FOLLOW(E')         |
| T            | {id1} | FIRST(id1)        | {+}    | FIRST(+)           |
| F            | {id2} | FIRST(id2)        | {$}    | FIRST(E)           |

An SLR parsing table may be constructed accounting for the following:

"s" to indicate a shift action. So, "si" means shift state "i".

"r" is used to indicate the reduce action, and hence "rj" means reduce by production numbered "j".

Accept is specified as "acc".

A blank entry in the table indicates error.

The resulting SLR parsing table will have the elements shown in Table 22 below:

TABLE 22

| STATE | ACTION | | | | GOTO | | | |
|-------|--------|------|------|------|------|------|------|------|
|       | +      | id1  | id2  | $    | E'   | E    | T    | F    |
| 0     |        | s3   |      |      |      | 1    | 2    |      |
| 1     |        |      |      | acc  |      |      |      |      |
| 2     | s4     |      |      |      |      |      |      |      |
| 3     | r2     |      |      |      |      |      |      |      |
| 4     |        |      | s6   |      |      |      |      | 5    |
| 5     |        |      |      | r1   |      |      |      |      |
| 6     |        |      |      | r3   |      |      |      |      |

Now, consider the collection set of I0 from Table 20 above. From T0, there are several goto( ) options. Goto(I0, id1)=I3. According to the above-described algorithm, this is a shift action and is marked as "s3" in Table 22 at the entry corresponding to state 0, action id1 (e.g., [0, id1]). The entries are summarized as shown below:

Goto(I0, id1)=I3=>[0, id1]=s3
Goto(I2, +)=I4=>[2, +]=s4
Goto(I4, id2)=I6=>[4, id2]=s6

Similarly, in the parsing table Goto(I0, E)=1 and so at the entry of the parsing table of Table 22 is set to 1 for [0, E]. All the entries can be summarized as shown below:

Goto(I0, E)=1=>[0, E]=1
Goto(I0, T)=2=>[0, T]=2
Goto(I4, F)=5=>[4, F]=5

After looking at the shift and GoTo actions, the accept action may be set based on the augmented grammar's first production. Accordingly, where (E'→E.) is available, this item may be set against $ as accept. In the expression grammar (E'→E.) is available in Item 1, so the entry [1, $] may be marked with "acc" to indicate the accept action.

The items having a dot (.) at the rightmost-end of the production rules (Table qualify for reduce actions. As shown in Table 23 below, there are 3 items on which the reduce action is applied. The reduce action procedure is explained in the below Table 23 and the relevant productions are:

E'→E
E→T+F
T→id1
F→id2

TABLE 23

| Item | Production | Explanation |
|---|---|---|
| I3 | T → id1. | Consider the Follow of T = {+}. Thus at the entry for state 3, we set [3, +] = r2. r2 indicates reduce by the 2nd production which happens to be T -> id1 |
| I6 | F → id2. | Consider the Follow of F = {$}. Thus at the entry for state 6, we set [6, $] = r3. r3 indicates reduce by the 3rd production |

TABLE 23-continued

| Item | Production | Explanation |
|---|---|---|
| | | which happens to be F -> id2 |
| I5 | E → T + F. | Consider the Follow of E = {$}. Thus at the entry for state 5, we set [5, $] = r1. r1 indicates reduce by the 1st production which happens to be E -> E + T |

After constructing the parsing table, the SLR parsing algorithm uses Table 22 along with a stack to validate a given string. The SLR(1) parser uses the stack for manipulating the input string to decide on successful or unsuccessful parsing action. The stack may be loaded with the initial state symbol 0 and the input string is appended with $ symbol, to indicate the end of the input. The steps involved may be expressed as:

Let s be the state on the top of the stack:
Let a be the symbol pointed to by the input.

If action[s, a]=shift s' then
    Push a then s' on the top of the stack
    Move input to the next symbol
Else if, action[s, a]=reduce A→β then,
    Pop 2*|β| length of symbols off the stack
    Let s' be the state now on the top of the stack.
    Push A, then goto[s', A] (from the parse table) on top of the stack
Else if, action[s, a]=accept
    Return the "Accept" state as output
Else if, action[s, a] returns an empty action,
    Return "Error" state as output.

The overall parsing action is explained via Table 24 below, where the Comments indicate how the parsing action is performed.

TABLE 24

| Stack | Input | Action | Comments |
|---|---|---|---|
| 0 | id1 + id2 $ | [0, id1] → s3, shift | The stack is initialized with the state '0'; compare 0, id1 in the input, which is a shift action 's3', so first shift input 'id1' then the state '3' |
| 0 id1 3 | +id2 $ | [3, +] → r2, reduce, pop 2 symbols, Goto[0, T] = 2 | This is a reduce action, so pop 2*r symbols. The production is T → id1, so pop two symbols (3, id), then do a goto(0, T) in the table which is 2, so push T2. |
| 0 T 2 | +id2 $ | [2, +] → s4, shift | Compare 2, + in the input which is a shift action 's4'. So first shift input '+' then the state '4' |
| 0 T 2 + 4 | id2 $ | [4, id2] → s6, shift | Compare 4, id2 in the input which is a shift action 's6'. So first shift input 'id2' then the state '6' |
| 0 T 2 + 4 id2 6 | $ | [6, $] → r3, reduce | This is a reduce action, so pop 2*r symbols. The production is F → id2, so pop two symbols (6, id2), then do goto(4, F) in the table which is 5, so push F5 |
| 0 T 2 + 4F 5 | $ | [5, $] → r1, reduce | This is a reduce action, so pop 2*r symbols. The production is E → T + F, so pop six symbols (5, F, 4, +, 2 T), then do a goto(0, E) in the table which is 1, push E 1 |
| 0 E 1 | $ | [1, $] → acc, hence successful parsing | Input is over and the parser is left with $ in the input. The table entry [1, $] is accept and hence the provided string belongs to the grammar. |

As shown above, the SLR parser provided by the query validator 640 may be utilized to validate a rewritten query prior to executing the query against a data source (e.g., by passing the rewritten query to the Data API 530 of FIG. 5).

In an additional or alternative aspect, the query validator 640 may utilize a top down parser, which is a type of parser that builds the parse tree from the top down, starting with a start non-terminal. It is noted that there are two types of Top-Down Parsers: (1) Top-Down Parser with Backtracking; and (2) Top-Down Parsers without Backtracking. The top-down parser with backtracking may utilize a brute force method to parse the given input, while the top-down parser without backtracking may utilize a recursive descent, a non-recursive decent, or both. In embodiments, the query validator 640 may utilize a form of non-recursive decent top-down parser without backtracking, referred to as an LL(1) parser, where the first L represents that the scanning of the input will be done in a left-to-right manner and the second L indicates the parsing technique uses a left-most derivation tree. The 1 in LL(1) represents the number of look-ahead symbols utilized, which specifies how many symbols the parser will see when making decisions.

In an aspect, the LL(1) parser may be used to validate queries for particular data sources while the SLR(1) parser described above may be used to validate queries for other data sources. For example, the SLR(1) parser may be used to validate queries targeted for the relational database 153 of FIG. 1, while the LL(1) parser may be utilized to validate queries with respect to a BigQuery syntax (e.g., for the BigQuery database 154 of FIG. 1) as per a defined grammar. Below, exemplary the steps that may be performed to validate queries according to a BigQuery syntax using an LL(1) parser are described.

Production rules are the set of rules used to replace the non-terminal symbols with the terminal symbols in order to validate the query syntax. As explained above, one of the first steps for validating query syntax may involve identification of terminals, non-terminals, and the production rules, where terminal symbols are the elementary symbols of the language defined by a formal grammar, and non-terminal symbols (or syntactic variables) are replaced by groups of terminal symbols according to the production rules.

The LL (1) parser may construct a parsing table using the following steps:
Step 1: First check for left recursion in the grammar, if there is left recursion in the grammar remove that and go to step 2.
Step 2: Calculate First( ) and Follow( ) for all non-terminals.
  1.) Calculating First( ) set: If there is a variable, from that variable, if we try to drive all the strings then the beginning Terminal Symbol is called the First. The following rules may be utilized to compute the First( ) set:
  If x is a terminal, then FIRST (x)={'x'}
  If x→€, is a production rule, then add € to FIRST(x).
  If X→Y1 Y2 Y3 . . . . Yn is a production, FIRST(X)=FIRST(Y1)
  (1) If FIRST(Y1) contains € then FIRST(X)={FIRST (Y1)–€} U {FIRST(Y2)}
  (2) If FIRST (Yi) contains € for all i=1 to n, then add € to FIRST(X).
  2.) Calculate Follow( ) set: Follow gives you the set of terminals that can follow X in a string derived in the grammar. The following rules may be utilized to compute the Follow( ) set:
FOLLOW(S)={$} //where S is the starting Non-Terminal
  If A→ pBq is a production, where p, B and q are any grammar symbols, then everything in FIRST(q) except € is in FOLLOW(B).

If A→pB is a production, then everything in FOLLOW (A) is in FOLLOW(B).
If A→pBq is a production and FIRST(q) contains €, then FOLLOW(B) contains {FIRST(q)–€} U FOLLOW(A)
Step 3: For each production A→α. (A tends to alpha)
  (1) Find First(α) and for each terminal in First(α), make entry A→α in the table.
  (2) If First(α) contains ε(epsilon) as terminal then, find the Follow(A) and for each terminal in Follow (A), make entry A→α in the table.
  (3) If the First(α) contains ε and Follow (A) contains $ as terminal, then make entry A→α in the table for the $.
  (4) In the table, rows will contain the Non-Terminals and the column will contain the Terminal Symbols. All the Null Productions of the Grammars will go under the Follow elements and the remaining productions will lie under the elements of the First set ( ). A sample parsing table that may be generated using the techniques described above is shown below:

| Nonterminal | select | distinct | col_iden | from | table_iden | $ |
|---|---|---|---|---|---|---|
| S | S -> S' | | | | | |
| S' | S' -> SELECT | | | | | |
| SELECT | SELECT -> select DISTINCT | | | | | |
| DISTINCT | | DISTINCT -> distinct Col IDEN | | | | |
| Col IDEN | | | Col IDEN -> col iden FROM | | | |
| FROM | | | | FROM -> from TABLE IDEN | | |
| TABLE_IDEN | | | | | | TABLE IDEN -> table iden |

Using a parsing table similar to the exemplary table above, an input (e.g., a rewritten query) may be validated using the exemplary steps below:
Step 1: Validate whether all the input entities are part of the terminals
Step 2: Append a symbol "$" at the end of the input and at the start of the stack to validate end of user input.
Step 3: Append the start symbol from the grammar to the stack.
Step 4: If the last entity of the stack is a non-terminal then look at the first value in the input and select the corresponding rule from the parse table. For example, "SELECT→select DISTINCT". There might be situation in which there can be multiple rules for the same terminal and non-terminal in parse table. In such cases the parser may check the next value in the input and pick that rule which has the same value as the non-terminal. For example, in the below table two rules are coming for same terminal "SELECT" and non-terminal entry in parse table. In this example, the parser may take "SELECT→select DISTINCT" since the next input is "distinct".

| Nonterminal | select |
|---|---|
| S | S -> S' |
| S' | S' -> SELECT |
| SELECT | SELECT -> select DISTINCT |
| | DISTINCT -> distinct Col IDEN |

Step 5: If the terminals in the stack and input match, they may be discarded. Else the parser throws an error stating that the query is invalid.

Step 6: Repeat Steps 4 and 5 until all the entries from stack and input have been discarded. If all the entries are discarded then the query is valid and may be utilized to provide access to the requested resource (e.g., as the restriction response 562 of FIG. 5).

The exemplary steps described above are graphically illustrated in FIG. 6B.

As shown above, the tokenizer 610, the lexical analyzer 620, the query generator 630, and the query validator 640 provide functionality to support operations of the enforcer 604 with respect to controlling access to resources according to provisions within access control policies. For example, the tokenizer 610 provides functionality for extracting a set of tokens from an input query and labelling the tokens. The set of labeled tokens may then be provided to the lexical analyzer 620 where the query is analyzed to identify tables and columns, as well as relationships and other information, that may be used to impart context to the query and for evaluating nested queries and relationships between nested (or inner) queries and outer queries. The query generator 630 (or query generator functionality of the enforcer 604) may be used to rewrite queries to accommodate and account for information derived from an access control policy during a policy resolution process, where the rewritten queries enforce restrictions on accessing a data source and retrieving data from the data source in a manner that complies with the access control policy. Finally, the query validation logic 640 provides functionality for validating that the query, whether modified by the query generator or not, complies with a grammar associated with the applicable data source in a context free manner. Using the techniques described above enables the enforcer 604 to rapidly enforce policy restrictions on access to data sources to ensure access to resources is provided in a manner that complies with configured policies. Moreover, the functionality of the tokenizer 610, the lexical analyzer 620, the query generator 630, and the query validator 640 may operate on queries irrespective of changes made to the applicable policies, thereby enabling policies to be created, modified, and replaced without requiring updating or modifying the functionality of the enforcer 604 and the supporting components described above.

Moreover, it should be understood that one or more of the functionalities described with respect to the tokenizer 610 and the lexical analyzer 620 may be used to support the functionality of the interceptor 602. For example, the tokenizer 610 and the lexical analyzer 620 may be utilized to analyze queries and extract information regarding table names, rows, columns, or other information from queries for use in making policy administration decisions (e.g., determining whether to grant or deny access) with respect to received access requests.

Referring back to FIG. 1, the one or more databases 118 may include an audit database that may be used to store all authorization and administration requests, as well as decisions on those request with respect to providing access control in the system 100. For example, the audit database may store records associated with access requests, as well as the policy administration and resolution outcomes determined for each requested access. In an aspect, any modifications or restrictions imposed on the access requests may also be included in the records. For example, the records may include the original query, the modified query, information regarding the policy or policies applied to the access request, errors detected during query validation (e.g., by query validator 640 of FIG. 6A), or other types of information. Storing the access requests and associated information for the administration and resolution decisions for those requests based enables a user (e.g., a user responsible for creating, maintaining, and designing access control policy) to audit performance of configured access control policies, reporting compliance results, identifying where modifications may be needed, or other analytics.

For example, the UIs of the policy administrator 121 may include an audit UI for viewing, analyzing, and auditing performance of configured access control policies to verify policies are being enforced as intended and/or identify situations where modifications should be made to one or more access control policies. Additionally, the audit records may also be used for testing purposes. For example, where an access control policy is modified, the user may run a query from the audit records associated with the resource to which the modified access control policy pertains and verify that the administration and resolution outcomes under the modified policy return different (and correct) outcomes as compared to the corresponding outcomes for the query under the prior policy changes.

The one or more databases 118 may also store the access control policies designed using the above-described functionality of the policy administrator 121. In an aspect, the access control policies may be stored as knowledge graphs, where nodes of the knowledge graph correspond to resources for which access control is to be provided. For example, different types of resources, such as data sources, devices, UIs, and the like, may be represented as a hierarchical set of nodes on the knowledge graph, and edges between the nodes may identify relationships between the resources. For example, a node may be used to represent data sources and that node may be linked to additional nodes representing specific data sources, such as relational database 153 and BigQuery database 154. Edges between the data sources node and the database nodes may indicate that the data sources have a relational database 153 and a BigQuery database 154. Similarly, the nodes corresponding to the relational database 153 and the BigQuery database 154 may have edges connecting them to other nodes, such as nodes representing the various tables of each database. Further nodes may also be provided to specify access controls of policies designed using the policy administrator 121 and the various techniques described above, and edges between policy nodes and resources nodes may be used to identify policies to be enforced with respect to different ones of the resources (e.g., an edge between the node corresponding to the BigQuery database 154 and an access control policy node may indicate a relationship: the BigQuery database 154 has access control policy to signify that access to the BigQuery database 154 is governed by the policy node corresponding to the edge). It is noted that the exemplary concepts described above for utilizing knowledge graphs to store access control policy information has been provided for purposes of illustration, rather than by way of limitation and that other arrangements of nodes and edges may be used to store access control policies in accordance with the concepts described herein.

The one or more databases 118 may also include one or more databases that may be used to provide identity verification. For example, individual users may have one or more user identifiers, such as a user name and password for logging into the system, application or domain specific identifiers for accessing services and applications (e.g., cloud-platforms and services, applications, etc.), or other forms of identifiers. These various identifiers may be stored in the identity database for use in authenticating users and performing policy administration in accordance with the techniques described above. For example, while a user may be associated with a first identifier (e.g., a username and password) for logging into the system 100, the user may be associated with other identifiers for accessing other resources, such as cloud-based platforms and services or applications. Despite having multiple identifiers, a single identifier may be provided in access requests and the functionality of the policy manager 120 may map the identifier to the appropriate identifier for a particular resource for which access has been requested. Additionally, as the user is authenticated with respect to access of various resources, such as applications, additional forms of identifiers may be generated, such as tokens indicating the user is authorized to use the application or other system functionality. In an aspect, interaction with and utilization of the identifiers stored in the identity database(s) may be managed or facilitated by one or more of the PIPs 125 which, as described above, may interact with the PDP(s) 124 to verify identities during policy administration or other operations of the system 100.

The one or more databases 118 may also include one or more databases that may be used to provide identity verification. For example, individual users may have one or more user identifiers, such as a user name and password for logging into the system, application or domain specific identifiers for accessing services and applications (e.g., cloud-platforms and services, applications, etc.), or other forms of identifiers. These various identifiers may be stored in the identity database for use in authenticating users and performing policy administration in accordance with the techniques described above. For example, while a user may be associated with a first identifier (e.g., a username and password) for logging into the system 100, the user may be associated with other identifiers for accessing other resources, such as cloud-based platforms and services or applications. Despite having multiple identifiers, a single identifier may be provided in access requests and the functionality of the policy manager 120 may map the identifier to the appropriate identifier for a particular resource for which access has been requested. Additionally, as the user is authenticated with respect to access of various resources, such as applications, additional forms of identifiers may be generated, such as tokens indicating the user is authorized to use the application or other system functionality. These identifiers may also be used and mapped to user identifiers to facilitate policy administration with respect to granting or denying access to resources and may be In an aspect, interaction with and utilization of the identifiers stored in the identity database(s) may be managed or facilitated by one or more of the PIPs 125 which, as described above, may interact with the PDP(s) 124 to verify identities during policy administration or other operations of the system 100.

It is noted that while FIG. 1 illustrates the policy administrator 121, the interceptor 122, the enforcer 123, the PDPs 124, the PIPs 125, and the tokenizer 126 as being components of a single device—namely, the access control device 110—other deployments and arrangements of the system 100 may also be provided in accordance with the present disclosure. For example and referring to FIG. 2, a block diagram illustrating another example of a system that supports policy based access control according to one or more aspects of the disclosure is shown. As compared to the system 100, the access control device 110' of FIG. 2 does not include the interceptor 122, the enforcer 123, or the PIPs 125, which are instead provided as separate devices communicatively coupled to the access control device 110' via the one or more networks 160. Separating the functionality of the these components may be provided for load balancing or other performance related reasons but operate in substantially the same manner as described above. It is noted that other configurations and arrangements of the various components may also be utilized in accordance with the concepts described herein and that the distributed arrangement shown in FIG. 2 has been provided for purposes of illustrating that distributed systems may be utilized to provide centralized policy administration and enforcement mechanisms using the techniques disclosed herein. Accordingly, it is to be understood that distributed systems operating in accordance with the access control techniques disclosed herein may be established in arrangements other than the exemplary arrangement shown in FIG. 2 to provide policy based access control in accordance with the present disclosure.

Figure 7:
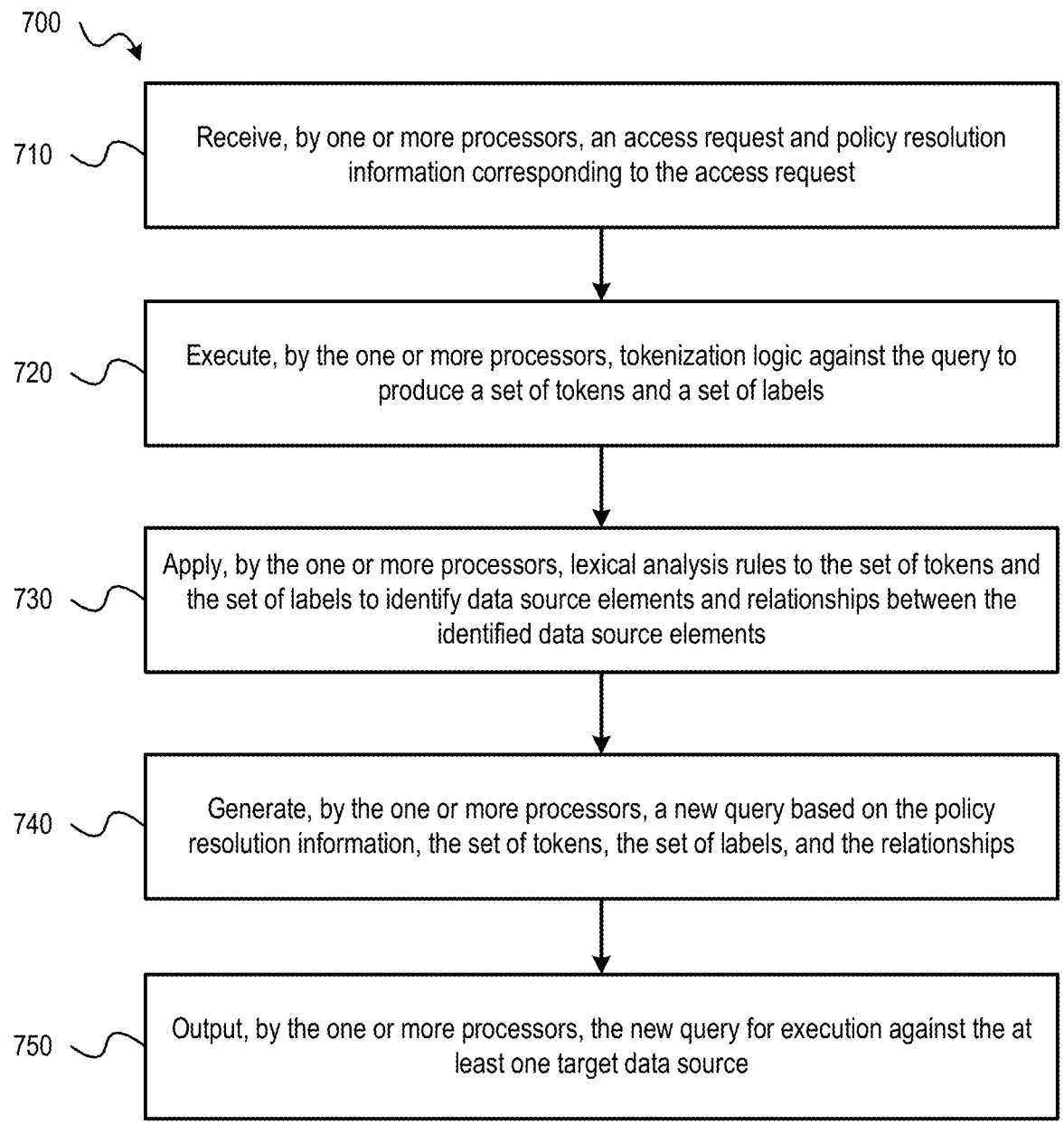
FIG. 7 is a flow diagram of an exemplary method for controlling access to digital resources according to one or more aspects of the disclosure.

Referring to FIG. 7, a flow diagram of an exemplary method for controlling access to digital resources is shown as a method 700. In an aspect, the method 700 may be performed by a system, such as the system 100 of FIG. 1, the system 200 of FIG. 2, or other exemplary configurations of the components of systems 100 and 200 and their functionality as described herein with reference to FIGS. 3A-6B. In an aspect, steps of the method 700 may be stored as instructions (e.g., the instructions 116 of FIGS. 1, 2) that, when executed by one or more processors, cause the one or more processors to perform operations for controlling access to digital resources in accordance with the concepts described herein.

At step 710, the method 700 includes receiving, by one or more processors, an access request and policy resolution information corresponding to the access request. As described above with reference to FIG. 5, the access request may be generated by a user device and may be communicated to the one or more processors (e.g., processors of an interceptor) via one or more intermediate devices or network connections, such as UI client 510, the back-end API 520, and the data API 530, as described above with reference to FIG. 5. In other examples one or more of these devices, interfaces, or connections may be omitted or swapped with other devices, interfaces, or connections according to the particular configuration of the system. In some examples, the access request includes a query, as described above with reference to FIG. 6, for example. However, it should be understood that the operations of the method 700 may be readily applied to access requests corresponding to other types of digital resources. For example, in the context of the present disclosure, digital resources for which the method 700 may be utilized to control access can include data sources (e.g., FIGS. 3D-3E, 4A-4D, 5, 6B), applications or application elements (e.g., FIG. 3E-3F), services or service elements (e.g., FIGS. 3E-3F), UIs or UIEs (e.g., FIG. 3C), devices, networks, entry control systems, and the like. As described above with reference to FIG. 5, step 510 may also involve performing policy administration to determine whether access is to be granted or denied, which may occur prior to receiving the policy resolution information.

At step 720, the method 700 includes executing, by the one or more processors, tokenization logic against the query to produce a set of tokens and a set of labels. In an aspect, the tokenization logic may be associated with the tokenizer 126 of FIGS. 1 and 2 or tokenization logic 612 of tokenizer 610 of FIG. 6A. In an aspect, the tokenization logic may be integrated with or a part of an enforcer, such as the enforcer 123 of FIGS. 1 and 2, the enforcer 560 of FIG. 5, or the enforcer 604 of FIG. 6A. As described above, the set of tokens generated by the tokenizer may include one or more tokens, each token corresponding to a different element of the query. The set of labels includes a label for each token in the set of tokens, where the labels identify a type associated with each token. In an aspect, the labels may include one or more of the labels shown in Table 3 above.

At step 730, the method 700 includes applying, by the one or more processors, lexical analysis rules to the set of tokens and the set of labels to identify data source elements and relationships between the identified data source elements. As described above, the data source elements may correspond to at least one target data source associated with the query and may include column names, column alias, tables, table alias, and the like. At step 740, the method 700 includes generating, by the one or more processors, a new query based on the policy resolution information, the set of tokens, the set of labels, and the relationships identified using the lexical analysis rules. As described above with reference to enforcer 560 of FIG. 5 and the query generator 640 of FIG. 6, the new query may be different from the query. For example, the new query may include one or more restrictions with respect to retrieving data from applicable data sources, where the differences between the query and the new query are based on the policy resolution information, which may specify the one or more restrictions (e.g., in a policy resolution matrix as in FIGS. 4B and 4D). It is noted that while primarily described with respect to queries, step 730 may also be used to configure presentation of UIs and UIEs to users, as well as access to applications, services, devices, and other digital resources as needed.

At step 750, the method 700 includes outputting, by the one or more processors, the new query for execution against the at least one target data source. As described above with reference to FIG. 5, once the new (modified) query incorporating applicable restrictions from the policy resolution information has been generated, it may be provided to the requestor (e.g., the data API or another digital resource access device/application/interface). Upon executing the new query against the relevant data source(s), information may be returned to the user device in a manner that complies with applicable restrictions. Notably, the disclosed techniques of the method 700 provide a standard form for determining whether to grant access to various kinds of digital resources, as well as mechanisms to control enforcement of restrictions where access to the digital resources is granted. For example, in addition to enforcing restricted access to data of a data source, such as a row/column restrictions, the restrictions applied using the method 700 may include restrictions based on UI access (e.g., to disable or enable access to specific UIs and/or UIEs), application access, device access, or other types of restrictions with respect to digital resources according to the techniques described herein.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

One or more components, functional blocks, and modules described herein with respect to FIGS. 1-7 may include processors, electronics devices, hardware devices, electronics components, logical circuits, memories, software codes, firmware codes, among other examples, or any combination thereof. In addition, features discussed herein may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits, and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules, and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. In some implementations, a processor may also be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or any combination thereof. Implementations of the subject matter described in this specification also may be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media can include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, hard disk, solid state disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, various terminology is for the purpose of describing particular implementations only and is not intended to be limiting of implementations. For example, as used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). The term "coupled" is defined as connected, although not necessarily directly, and not necessarily mechanically; two items that are "coupled" may be unitary with each other. the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified—and includes what is specified; e.g., substantially 90 degrees includes 90 degrees and substantially parallel includes parallel—as understood by a person of ordinary skill in the art. In any disclosed aspect, the term "substantially" may be substituted with "within [a percentage] of" what is specified, where the percentage includes 1, 5, and 10 percent; and the term "approximately" may be substituted with "within 10 percent of" what is specified. The phrase "and/or" means and or.

Although the aspects of the present disclosure and their advantages have been described in detail, it should be understood that various changes, substitutions and alterations can be made herein without departing from the spirit of the disclosure as defined by the appended claims. Moreover, the scope of the present application is not intended to be limited to the particular implementations of the process, machine, manufacture, composition of matter, means, methods and processes described in the specification. As one of ordinary skill in the art will readily appreciate from the present disclosure, processes, machines, manufacture, compositions of matter, means, methods, or operations, presently existing or later to be developed that perform substantially the same function or achieve substantially the same result as the corresponding aspects described herein may be utilized according to the present disclosure. Accordingly, the appended claims are intended to include within their scope such processes, machines, manufacture, compositions of matter, means, methods, or operations.

What is claimed is:

1. A method for controlling access to a digital resource, the method comprising:
   receiving, by one or more processors, an access request and policy resolution information corresponding to the access request, wherein the access request comprises a query;
   executing, by the one or more processors, tokenization logic against the query to produce a set of tokens and a set of labels, wherein the set of tokens comprises one or more tokens, each token corresponding to a different element of the query, and wherein the set of labels includes a label for each token in the set of tokens, the labels identifying a type associated with each token;
   applying, by the one or more processors, lexical analysis rules to the set of tokens and the set of labels to identify data source elements and relationships between the identified data source elements, the data source elements corresponding to at least one target data source associated with the query, wherein the lexical analysis rules are configured to assign an identifier to each token of the set of tokens, and wherein the identifier assigned to each token comprises information associated with a position of a token corresponding to the identifier within the query and an indication of whether the token corresponds to a "with" query structure, a nested function, a column definition, and a subquery level within the query;
   generating, by the one or more processors, a new query based on the policy resolution information, the set of tokens, the set of labels, and the relationships identified using the lexical analysis rules, wherein the new query is different from the query, and wherein the difference between the query and the new query is based on the policy resolution information; and
   outputting, by the one or more processors, the new query for execution against the at least one target data source.

2. The method of claim 1, wherein the data source elements identified by the lexical analysis rules comprise table names, column names, table aliases, column aliases, or a combination thereof, and wherein the relationships identified using the lexical analysis rules correspond to table name-table alias relationships, column name-column alias relationships, or both.

3. The method of claim 1, wherein the lexical analysis rules are configured to determine whether a token of the set of tokens belongs to the subquery level within the query based on the token and the label associated with a token preceding the token.

4. The method of claim 1, further comprising validating the new query prior to outputting the new query.

5. The method of claim 4, wherein validating the new query comprises:
   determining a grammar associated with the new query; and
   verifying whether the new query complies with the grammar.

6. The method of claim 1, wherein the new query is configured to restrict access to a portion of the at least one data source according the policy resolution information.

7. The method of claim 6, wherein the portion of the at least one data source for which access is restricted by the new query comprises one or more columns, one or more rows, one or more cells, or a combination thereof.

8. The method of claim 6, wherein restricting access to the portion of the at least one data source comprises applying mask values to data retrieved from the portion of the at least one data source using the new query, wherein the mask values are configured by the policy resolution information.

9. A system for providing centralized control with respect to access of digital resources, the system comprising:
   a memory storing one or more access control policies;
   one or more processors communicatively coupled to the memory;
   an interceptor executable by the one or more processors, the interceptor configured to:
      receive an access request;
      determine a policy administration outcome for the access request based on at least one access control policy of the one or more access control policies; and
      subsequent to a policy administration outcome indicating access is granted, determine policy resolution information corresponding to the access request;
   a tokenizer executable by the one or more processors, the tokenizer configured to:
      generate a set of tokens based on elements of a query included in the access request; and
      assign a label to each token in the set of tokens, wherein the label corresponding to each token identifies a type of the corresponding token;
   a lexical analyzer executable by the one or more processors, the lexical analyzer configured to identify data source elements and relationships between the identified data source elements based on the set of tokens, the labels, and a set of lexical analysis rules, wherein the data source elements correspond to at least one target data source associated with the query, and wherein the set of lexical analysis rules is configured to assign an identifier to each token of the set of tokens, and wherein the identifier assigned to each token comprises information associated with a position of a token corresponding to the identifier within the query and an indication of whether the token corresponds to a "with" query structure, a nested function, a column definition, and a subquery level within the query;
   a query generator executable by the one or more processors to generate a new query based on the policy resolution information, the set of tokens, the set of labels, and the relationships identified using the set of lexical analysis rules, wherein the new query is different from the query according to the policy resolution information; and
   a communication interface configured to output the new query for execution against the at least one target data source.

10. The system of claim 9, further comprising an enforcer executable by the one or more processors, wherein the tokenizer, the lexical analyzer, and the query generator are components of the enforcer and provide an enforcement layer for controlling access to the digital resources.

11. The system of claim 9, wherein the data source elements identified by the lexical analyzer comprise table names, column names, table aliases, column aliases, or a combination thereof, and wherein the relationships identified using the set of lexical analysis rules correspond to table name-table alias relationships, column name-column alias relationships, or both.

12. The system of claim 9, wherein the set of lexical analysis rules are configured to determine whether a particular token of the set of tokens correspond to the subquery level within the query based on a value of the particular token and the label associated with a token preceding the particular token.

13. The system of claim 9, further comprising a query validator configured to:
   determine a grammar associated with the new query;
   verify whether the new query complies with the grammar.

14. The system of claim 9, wherein the interceptor is further configured to initiate an identity validation process to validate identity information associated with the access request.

15. The system of claim 9, wherein the new query is configured to restrict access to a portion of the at least one data source according the policy resolution information, wherein the portion of the at least one data source comprises one or more columns, one or more rows, one or more cells, or a combination thereof.

16. The system of claim 15, wherein the new query is configured to restrict access to the portion of the at least one data source by applying mask values to data retrieved from the portion of the at least one data source using the new query, wherein the mask values are configured by the policy resolution information.

17. A non-transitory computer-readable storage medium storing instructions that, when executed by one or more processors, cause the one or more processors to perform operations for providing centralized control with respect to access of digital resources, the operations comprising:
   detecting an access request associated with a user device at a centralized access control system, the access request associated with a digital resource, wherein the digital resource is a user interface, an application, a data source, a service, a device, or a combination thereof;
   identifying one or more access control policies corresponding to the access request;
   determining to grant the access request based on information included in the access request and the one or more identified access control policies;
   providing, in response to determining to grant the access request, policy information to an enforcer of the centralized access control system, wherein the policy information comprises information for restricting access to the digital resource in accordance with requirements of the one or more identified access control policies;
   reconfiguring at least a portion of the access request based on the policy information to get a reconfigured access request, wherein reconfiguring the portion of the access request comprises restricting access to at least a portion of the digital resource, and wherein restricting access to the portion of the digital resource comprises disabling one or more user interface elements when the digital resource is a user interface, generating a new query when the digital resource is a data source, disabling a function when the digital resource is an application or service, or disabling use of one or more portions of a device when the digital resource is a device;
   outputting the reconfigured access request, wherein the access to the digital resource is restricted according to the reconfigured access request.

* * * * *